US006721647B1

(12) United States Patent
Kita et al.

(10) Patent No.: US 6,721,647 B1
(45) Date of Patent: Apr. 13, 2004

(54) METHOD FOR EVALUATION OF A GENETIC ALGORITHM

(75) Inventors: Hajime Kita, Shizuoka (JP); Takaaki Mizutani, Shizuoka (JP); Masashi Yamaguchi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 09/347,469

(22) Filed: Jul. 2, 1999

(30) Foreign Application Priority Data

Jul. 2, 1998 (JP) ............................................ 10-187181

(51) Int. Cl.$^7$ .............................. F02D 41/14; G06N 3/12
(52) U.S. Cl. ............................. 701/106; 700/48; 706/13
(58) Field of Search ................................. 701/106, 110, 701/115; 706/13; 700/30, 31, 47, 48

(56) References Cited

U.S. PATENT DOCUMENTS 4,935,877 A * 6/1990 Koza ............................ 706/13

FOREIGN PATENT DOCUMENTS

JP           10-154003     * 6/1998    ........... G05B/13/02

OTHER PUBLICATIONS

Bose Bimal K., (1994), "Expert System, Fuzzy Logic, and Neural Network Applications in Power Electric and Motion Control", Processing of the IEEE, vol. 82, No. 8, pp. 1303–1323.*

Brotherton, Thomas W., et al., *Classifier Design Using Evolutionary Programming*, Pub. Date 1996, pp. 68–75.*

Furuhashi, T., et al., *Evolutionary Fuzzy Modeling Using Fuzzy Neural Networks and Genetic Algorithm*, IEEE 1997, pp. 623–627.*

Gradetsky V.G. and Ulyanov S.V., (1993), "Mobile system with wall climbing robots", Intern. J. of Computer and Systems Sciences, vol. 31, No. 1, pp. 126–142.*

Hines, J. Wesley, et al., *Signal Validation using an Adaptive Neural Fuzzy Inference System*, Nuclear Technology, vol. 119, Aug. 1997, pp. 181–193.*

Johansson R., Magnusson M. and Fransson P.A., (1995), "Galvanic vestibular stimulation for analysis of postural adaptation and stability", IEEE Transactions on Biomedical Engineering, vol. 42, No. 3, pp. 282–292.*

Ju M.–S., Yi S.–G., Tsuei Y.–G, and Chou Y.–L., (1995), "Fuzzy control of electrohydraulic above–knee prostheses", JSME International Journal, vol. 38, No. 1, pp. 78–85.*

Lee Y.N., Kim T.W. and Suh I.H., (1994), "A look–up table–based self–organizing fuzzy plus linear controller", Mechatronics, vol. 4, No. 1, pp. 71–90.*

(List continued on next page.)

*Primary Examiner*—Andrew M. Dolinar
(74) *Attorney, Agent, or Firm*—Knobbe, Martens, Olson & Bear LLP

(57) ABSTRACT

A technique for estimating the best children (i.e. the next generation of individual chromosomes) for use by an online genetic analyzer (GA) is described. One embodiment provides a method for evaluation of a GA in a control system for controlling a plant. Individuals are evaluated using data for evaluation. The data for evaluation is categorized into subdomains of a larger evaluating domain. Data for evaluation is sorted into an evaluation domain wherein an evaluation value of each individual is replaced by a model of coefficients relative to a standard model. The standard model is used to calculate an evaluation value. The evaluation value can include a mean value and/or a distribution. Moreover, the mean value and distribution can be valid for an area including a periphery of the subdomain. The evaluation value can be calculated as a model obtained by using a least-squares method to find coefficients relative to coefficients of the standard model.

26 Claims, 16 Drawing Sheets

OTHER PUBLICATIONS

Liu T.S. and Wu J.C., (1993), "A model for rider–motorcycle system using fuzzy control", IEEE Transactions on Systems, Man and Cybernetics, vol. 23–SMC, No. 1, pp. 267–276.*

Mendel, Jerry M., (1995), "Fuzzy Logic Systems for Engineering: A Tutorial", Proceeding of the IEEE, vol. 83, No. 3, pp. 345–377.

Ulyanov S.V., (1992), "Fuzzy models of Intelligent control systems: Theoretical and applied aspects" Soviet Journal of Computer and Systems Sciences (Engineering Cybernetics), vol. 30, No. 4, pp. 1–22.

Ulyanov S.V., Sheng Z.Q., Yamafuji K., Watanabe S. and Ohkura T., (1995), "Self–organization fuzzy chaos Intelligent controller for a robotic unicycle: A New benchmark in AI control", Proc. of $5^{th}$ Intelligent System Symposium: Fuzzy, AI and Neural Network Applications Technologies (FAN Symp. '95), Tokyo, pp. 41–46.

Ulyanov S.V. and Yamafuji K., (1996), "Fuzzy Intelligent emotion and instinct control of a robotic unicycle", $4^{th}$ Intern. Workshop on Advanced Motion Control, Mie, Japan, vol. 1, pp. 127–132.

Ulyanov S.V., Feng Q., Yamafuji K. and Ulyanov V.S., (1998), "Stochastic analysis of nonlinear dynamic system with time–dependent structure, Pts. 1, 2", Probabilistic Engineering Mechanics (published).

Ulyanov, S.V., Yamafuji, K., Ulyanov, V.S., Kurawaki, I., Hagiwara, T. and Panfilov, S.A., "Computational Intelligence for Robust Control Algorithms of Complex Dynamic Systems with Minimum Entropy Production Part 1: Simulation of Entropy–Like Dynamic Behavior and Lyapunov Stability", Journal of Advanced Computational Intelligence, vol. 3, No. 2, 1999, pp. 82–98.

Ulyanov, V.S., Yamafuji, K., Ulyanov, S.V., and Tanaka K., "Computational Intelligence with New Physical Controllability Measure sure Robust Control Algorithm of Extension–Cableless Robotic Unicycle", Journal of Advanced Computational Intelligence, vol. 3, No. 2, 1999, pp. 136–147.

van Rooij A.J.F., Jain L.C. and Johnson R.P., (1997), "Neural Network Training Using Genetic Algorithms" (Machine Perception and Artificial Intelligence, vol. 26). World Scientific Pub., SGP.

Vasilieva O.I., Ionov I.P. and Ulyanov S.V., (1989), "Dual control of the artificial ventilation process with use of a fuzzy controller in the feedback circuit", Biomedical Eng., vol. 23, No. 1, pp. 7–16.

Venetsky, L., et al., *Next Generation Test Generator (NGTG) For Analog Circuits, IEEE*, 1997, pp. 113–120.

Wu J.C. and Llu T.S., (1995), "Fuzzy control of rider–motorcycles system using genetic algorithm and auto–tuning", Mechatronics, vol. 4, No. 4, pp. 441–455.

Zhakharov V.N. and Ulyanov S.V., (1994), "Fuzzy models of intelligent industrial controllers and control systems. Pts 1", Journal of Computer and Systems Sciences International, vol. 32, No. 1, pp. 123–144.

Zhakharov V.N. and Ulyanov S.V., (1995), "Fuzzy models of intelligent industrial controllers and control systems. Pts 2,3", Journal of Computer and Systems Sciences International, vol. 33, No. 2, pp. 94–108, 117–136.

* cited by examiner

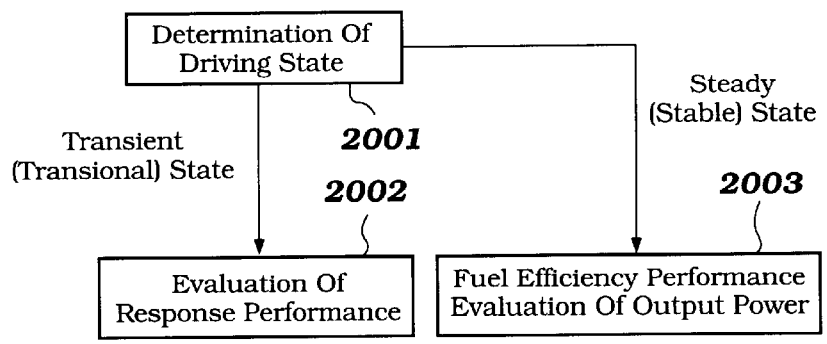
Figure 20
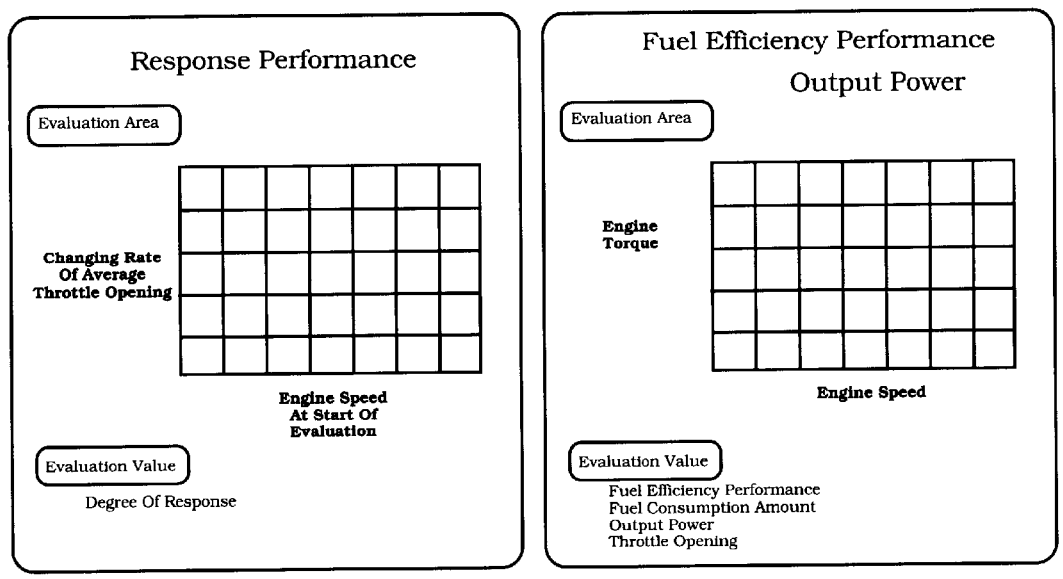
Figure 21(A)   Figure 21(B)

METHOD FOR EVALUATION OF A GENETIC ALGORITHM

BACKGROUND

1. Field of the Invention

The present invention relates to a method for evaluating a genetic algorithm, and particularly to a genetic algorithm used in a control system for an engine.

2. Related Art

When a control system or control characteristics of a machine, such as a vehicle or electrical appliance, is designed, imaginary users are selected, and the users' preferences and their using conditions are taken into consideration. The characteristics of the controlled machine (plant) are determined in such a way as to adapt the machine to users in as broad a range as possible.

However, each individual user has a particular and unique personality, and their preferences are diverse. Thus, there is a problem in that even if imaginary users are selected to develop and design a product for the users by presuming the users' preference, it is impossible to satisfy all of the users of the product.

In order to solve the above problem, prior to purchase of a product, in some cases a prospective user is requested to determine whether or not the product is satisfactory to the user after checking the characteristics of the product in light of the user's preferences. However, it is troublesome for the user to check the characteristics of the product before the purchase. Further, because a series of products are often operated or controlled by characteristics common in the products, although the design of the product is changed depending on the user's preferences, the user may not like other operational characteristics. Thus, although the design is appealing to some prospective users, the users may not purchase the product since the operational characteristics do not appeal to them. In the other words, there is another problem in that the range of users is limited and depends on the operational characteristics.

Online (i.e. during use by the user) adaptation of the control system using a genetic analyzer to accommodate user preferences is difficult because 1) the online system may not provide enough data for the genetic analyzer to operate properly (i.e. the online system may operate with a reduced sensor set) and 2) because the online genetic analyzer must operate very quickly in real, or near-real, time.

SUMMARY OF THE INVENTION

The present invention solves these and other problems by providing a way to estimate the best children (i.e. the next generation of individual chromosomes) for use by an online genetic analyzer (GA). One embodiment provides a method for evaluation of a GA in a control system for controlling a plant wherein control outputs appear in multiple operational stages of the controlled plant. Individuals are evaluated using data for evaluation. The data for evaluation is categorized into subdomains of a larger evaluating domain. In one embodiment, the data for evaluation is sorted into an evaluation area wherein an evaluation value of each individual is replaced by a model of coefficients relative to a standard model. In one embodiment, the standard model is used to calculate an evaluation value. The evaluation value can include a mean value and/or a distribution. Moreover, the mean value and distribution can be valid for an area including a periphery of the subdomain. The evaluation value can be calculated as a model obtained by using a least-squares method to find coefficients relative to coefficients of the standard model. Any controlled plant can be used, including engines, electric motors, air-conditioners, refrigerators, robots, etc.

Parameters for subdividing the evaluation domain can include items such as user preference, user skill level, plant operating conditions, environmental states, and/or other operating states (e.g. transient states, steady state, etc).

When used with an internal combustion engine, the optimized parameters can include fuel efficiency and response performance (e.g. power/acceleration).

One embodiment includes an integrated control method comprising the steps of: determining the characteristics of a user and/or using conditions; and changing characteristics of a control system of a machine in accordance with the determined characteristics. In the above, the machine is operable by a causative signal, and preferably, the control system first outputs a base value of the causative signal to control the machine based on indicative signals indicating a result of the control of the machine, and the changing step including the steps of: creating multiple control modules for representing at least one factor to be controlled; selecting at least one control module most adaptable for a current operational state based on the determined characteristics of the user and/or using conditions; learning information from a control module; compensating for the base value based on the result of the selection and the learning; and controlling the machine using the output compensated for.

According to the present invention, the machine is "trained" to suit the characteristics of the user and/or the using conditions, thereby easing control of the machine particularly for the user and enjoying training and adapting the machine to the user's preference.

In one embodiment, the control system includes: a reflection hierarchy for outputting the base value reflectively in response to input from the using conditions; an evolutionary-adaptation hierarchy for conducting the creating step, the selecting step, and the compensating step; and a learning hierarchy for conducting the learning step and the compensating step. In one embodiment, the learning hierarchy includes a control system for learning and a control system for operation, both control systems being interchangeable. While the control system for learning is learning, the control system for operation is controlling the machine in cooperation with the reflection hierarchy.

In the above, preferably, the evolutionary-adaptation hierarchy is inactivated when the control system for learning completes learning. Further, after being inactivated, the evolutionary-adaptation hierarchy is activated at given intervals to check drift between an actual state and a state controlled by the reflection hierarchy and the control system for operation in the learning hierarchy, and when there is drift, the evolutionary-adaptation hierarchy resumes the creating step and the selecting step. Accordingly, by checking the control particulars at given intervals, it is possible to constantly maintain the most suitable operation against a change in the using environment or deterioration with age.

Further, in the above method, parameter-obtaining devices are not newly required. Existing devices can be used for obtaining necessary parameters, thereby lowering the cost.

When the machine to be controlled is an engine installed in a vehicle, the operation characteristics of the engine can be changed to suit the driver's preferences, and when control is conducted based on the driver's skill, suitable driving performance can be realized in accordance with the driver's skill and its improvement.

Since the user can train the machine (engine) based on the user's preference after its purchase, the user can give less weight to the characteristics of the engine itself, and can select a vehicle from a wide range at purchase.

When the machine to be controlled is an auxiliary power unit installed in a bicycle or a wheelchair, the characteristics of the auxiliary power unit (motor) can be changed to suit the user's preferences, thereby effecting assistance most customized to each individual user.

When the machine to be controlled is a robot, the characteristics of the robot can be changed to suit the user's preferences, thereby operating the robot in a way most suitable to each individual user.

When the machine to be controlled is a suspension system or seat, the characteristics of the damper of the suspension system or seat can be changed to suit the user's preferences, thereby obtaining characteristics of the damper most suitable to each individual user.

When the machine to be controlled is a steering system of a vehicle, the characteristics of steering control can be changed to suit the user's preferences, thereby obtaining customized steering control characteristics most suitable to each user.

The present invention can be applied not only to a method but also to a system. An appropriate system can be constructed accordingly. In addition, although the present invention can advantageously and preferably be applied to an engine, it can be applied to other machines as described above.

BRIEF DESCRIPTION OF THE DRAWINGS

FIG. 5 is a distribution pattern of the maximum RPM at each gear position within a certain time period, which is used in the evaluation system of the evolutionary-adaptation hierarchy.

FIG. 6 is a distribution pattern of the maximum RPM at each gear position within a certain time period, which is used in the evaluation system of the evolutionary-adaptation hierarchy. FIG. 6b shows a pattern when only the fifth and sixth gears are used (freeway).

FIG. 20 is a flowchart showing selection of a valuation model based on steady state or transient performance.

FIG. 21A shows evaluation areas for response performance.

FIG. 21B shows evaluation areas for fuel efficiency.

DETAILED DESCRIPTION

An Integrated Control System

Figure 1:
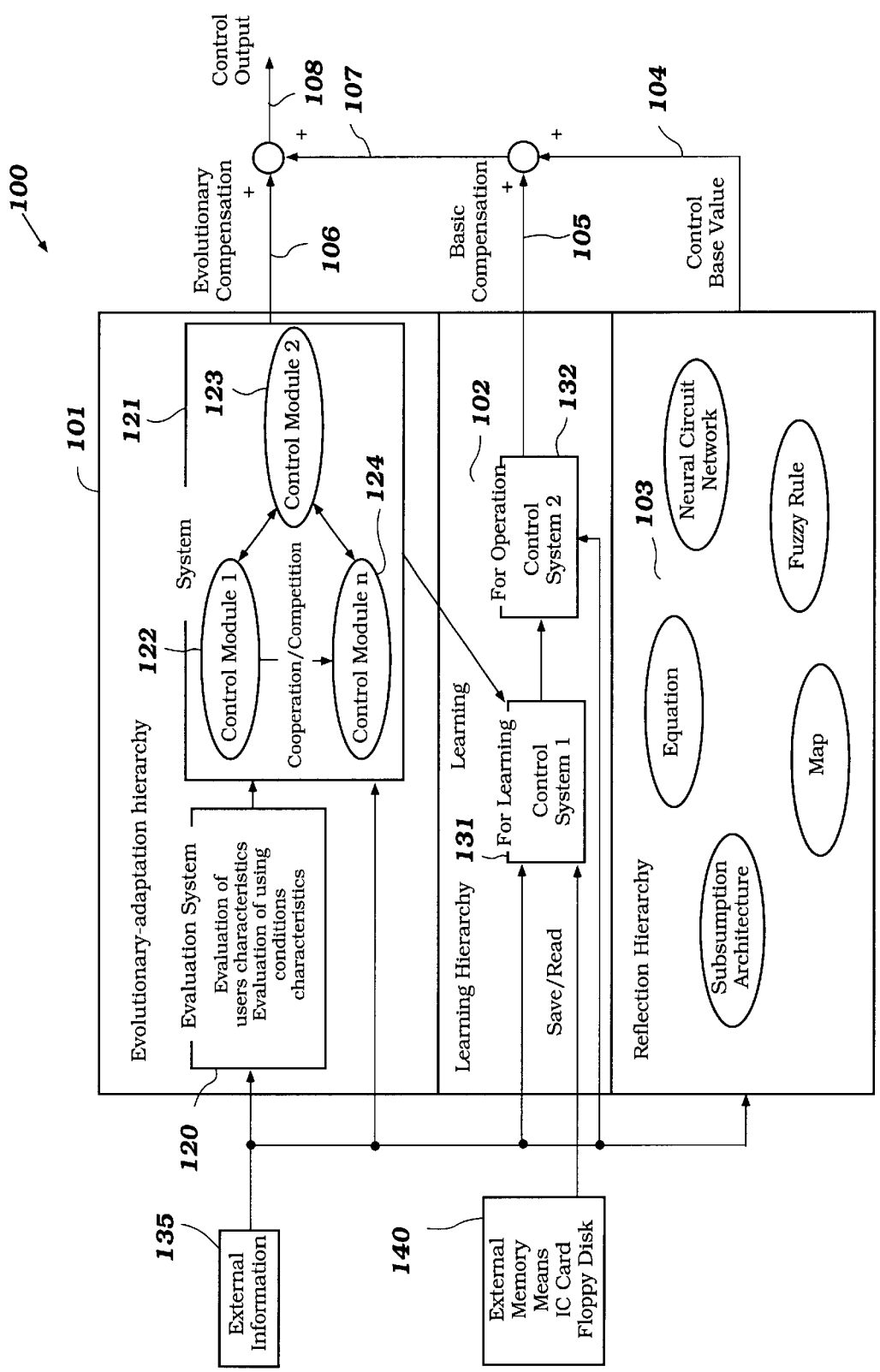
FIG. 1 is a block diagram showing the basic principle of an integrated control system having an evolution hierarchy, a learning hierarchy, and a reflection hierarchy.

FIG. 1 is a block diagram showing the basic principle of an integrated control system 100. As shown in FIG. 1, the integrated control system of this embodiment has three hierarchies, i.e., a reflection hierarchy 103, a learning hierarchy 102, and an evolutionary hierarchy 101, into which information related to the machine to be controlled, such as that related to a dynamic state, is input. Based on the information, a control base value 104 is determined in the reflection hierarchy 103, and compensations for the control base value are determined in the learning hierarchy 102 and in the evolutionary-adaptation hierarchy 101. A final control output 108 is determined based on the control base value and the compensations.

The reflection hierarchy 103 is a hierarchy installing a relationship between information related to the machine to be controlled (hereinafter referred to as external information) and a control base value for the external information, in a control system such as in the form of equations, maps, fuzzy rules, neural network (NN), or subsumption architecture. The control system calculates a control base value 104 using the external input information. The above subsumption architecture is typically a behavioral artificial intelligence which conducts parallel processing.

The evolutionary-adaptation hierarchy 101 includes an evaluation system 120 and an evolutionary-adaptation system 121. The evaluation system 120 is provided to input the external information and/or information related to user's characteristics (for example, preference, skill, or a state at the moment), and/or information related to user's using conditions (for example, a change in using environment), and based on the above information such as the external information, the characteristics of the user and/or the using conditions are evaluated. The evolutionary-adaptation 121 system is provided with at least one control module to compensate for the control base value to suit the characteristics of the user and/or the using conditions. The at least one control module genetically evolves based on the determination in the evaluation system 120, and converts into a control module most suitable at the moment. Upon obtaining the most suitable control module, the control module is fixed in the evolutionary system which then outputs an evolutionary compensation which compensates for the control base value output from the reflection hierarchy.

The learning hierarchy is comprised of two mutually switchable control systems, one control system for learning 131 and the other control system for operation 132. While the control system for operation 132 controls the plant (e.g., an engine), the control system for learning 131 learns the relationship of input and output regarding the most suitably evolved control module from the evolutionary-adaptation hierarchy 101 in combination with the relationship of input and output regarding the control system for operation 131 in the learning hierarchy 102. After completing the learning in the control system for learning 131, the control system operating control and the control system that has finished learning are switched over, whereby the control system after learning starts operating control using a control module obtained from the learning, whereas the control system previously operating control starts functioning as a control system for learning. The control system in the learning hierarchy 102 is set so as to output zero at the beginning, (i.e., control is conducted by the reflection hierarchy 103 and the evolutionary hierarchy 101 at the beginning).

The evolutionary hierarchy 101 returns its output to zero after causing the learning hierarchy 102 to learn information related to the most suitable control module. The evolutionary hierarchy 101 functions at given intervals to evaluate the user's preference and/or the using environment and to cause the control module to evolve. If the evaluation in the case of adding the output from the evolutionary hierarchy 101 is better than in the case of no addition of the output from the evolutionary hierarchy 101, the evolutionary hierarchy 101 causes the learning hierarchy 102 to re-learn information related to the most suitable control module.

In addition, the information related to the after-learning control-module 131 in the learning hierarchy 102 can be readably saved in external memory 104 such as an IC card, a floppy disk, and the like. The user can pull out the information related to the most suitable control module in the past from the external memory 104, according to the user's need, and the user can thereby output a basic compensation from the learning hierarchy 102 based on the stored information. In the above, when the user pulls out the information related to the most suitable control module in the past from the external memory 140, and operates the learning hierarchy 102, while the learning hierarchy 102 is functioning by the pulled-out control module, the output of the evolutionary hierarchy 101 is set at zero, i.e., evolutionary processes of the control module(s) are stopped.

According to the integrated control system 100 described above, by the function of each hierarchy, the control output 108 is changing in accordance with changes in the characteristics such as the user's preference and the using environment, and as a result, the characteristics of the machine to be controlled are changing in accordance with the characteristics of the user and/or the using conditions. The state, wherein the characteristics of the machine evolves to according to the characteristics of the user and/or the using conditions, is referred to as "training".

Control Flow of Integrated Control System

Figure 2:
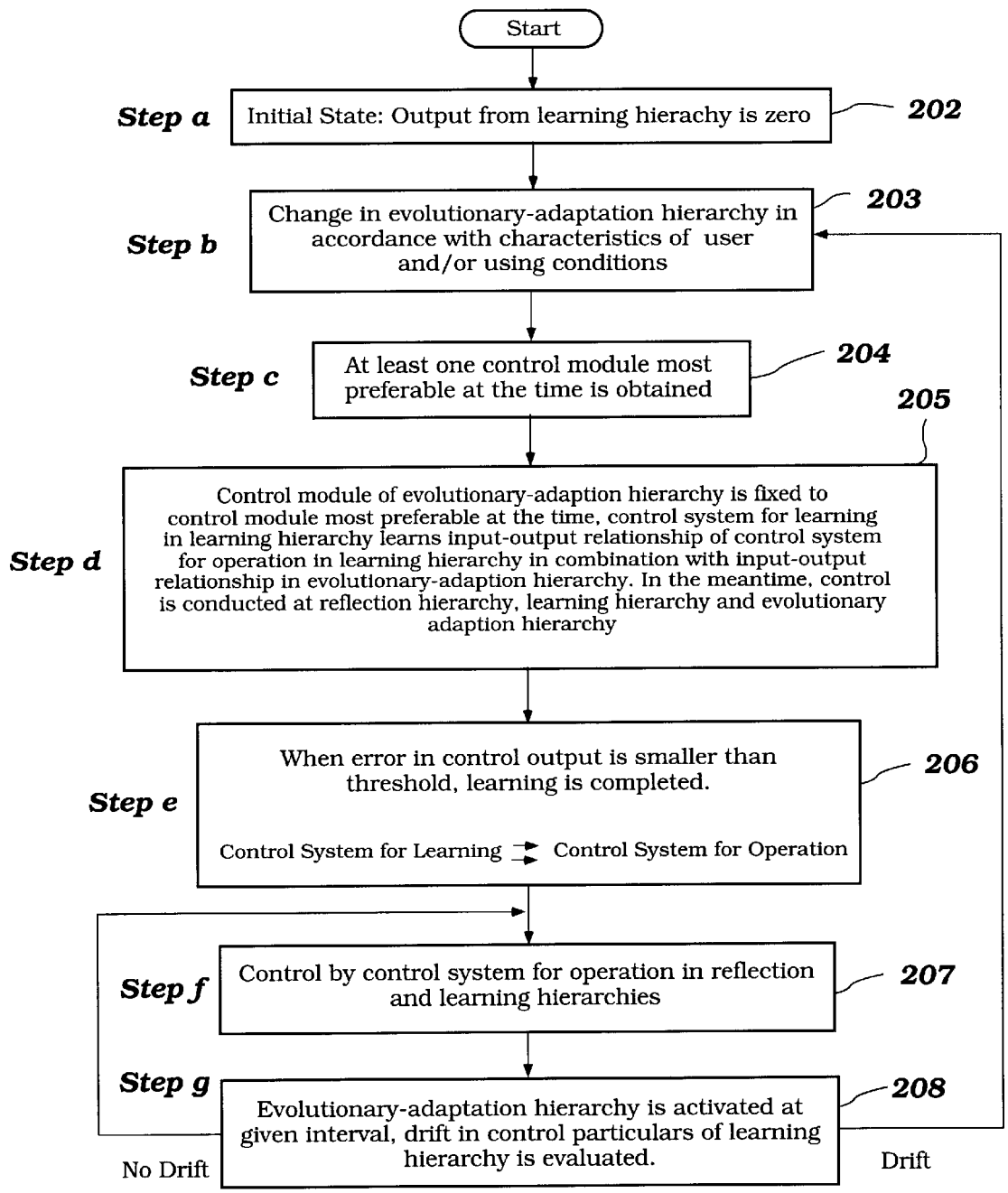
FIG. 2 is a flow chart showing operation of the integrated control system.

FIG. 2 is a flowchart of the operation of the integrated control system 100.

In an initial state 202, the output from the learning hierarchy is zero, and thus, immediately after the machine is activated, the machine is controlled only by the control base value from the reflection hierarchy 103.

After the machine is activated, the evolutionary-adaptation hierarchy 101 evaluates the characteristics of the user and/or the using conditions, and in accordance with the evaluated value, the evolutionary-adaptation hierarchy 101 causes a control module(s) (i.e. one of the modules in the system 121) to evolve (in a process block 203).

By genetically evolving each control module 122–124, the evolutionary-adaptation hierarchy 101 obtains at least one control module most preferable at the moment (in a process block 204).

In a process block 205, the evolutionary-adaptation hierarchy fixes the control module(s) to the most preferable control module obtained in the block 204, and outputs an evolutionary compensation using the fixed control module, thereby compensating for the control base value output from the reflection hierarchy 101. The learning hierarchy 102 learns, in the control system for learning 131, the relationship of input and output in the evolutionary-adaptation hierarchy 101 wherein the control module(s) is fixed to the most preferable control module, in combination with the relationship of input and output in the control system for operation in the learning hierarchy 102. In the above, while the output from the control system for operation in the learning hierarchy 102 is zero in the initial state, after learning, the basic compensation from the learning hierarchy 102 and the evolutionary compensation from the evolutionary-adaptation hierarchy 101 compensate for the control base value 104 from the reflection hierarchy 103.

In a process block 206, when the difference between the value, which is obtained by adding the output from the control system for learning 131 in the learning hierarchy 102 to the control base value 104, and the value, which is the actual output (control base value 104+basic compensation+ evolutionary compensation 106), is smaller than a predetermined threshold, the learning in the learning hierarchy 102 is completed. The control system for learning 131 and the control system for operation 132 are then switched over, i.e., the previous control system for learning functions as a control system for operation while the previous control system for operation functions as a control system for learning. After the switch, control is conducted by the reflection hierarchy and the learning hierarchy (in a process block 207).

After the evolutionary-adaptation hierarchy 101 causes the learning hierarchy 102 to learn information related to the most preferable control module, the evolutionary-adaptation hierarchy 101 is activated at given intervals to evaluate a drift by age in the control particulars of the learning hierarchy 102 (in a block 208). If the maximum adaptability is no longer improved in the initial generation when the control module(s) of the evolutionary-adaptation hierarchy 101 is genetically evolved, it is determined that there is no drift in the control particulars of the learning hierarchy 102, and the process returns to block 207 wherein control by the reflection hierarchy 103 and the learning hierarchy 102 is continued; conversely, if the maximum adaptability is further improved, it is determined that a drift is detected, and then the process jumps back to the process block 203 wherein a new control module most adaptable in the evolutionary-adaptation hierarchy 101 is found.

Integrated Control System Adapted to Engine of Vehicle

In one embodiment, a plant to be controlled is an engine installed in a vehicle or vessel. However, in the integrated control system of the present invention, no restriction is imposed on the type of plant to be controlled, and as with the engine, a robot used in machine tools, a motor used in electrically-driven vehicles, or the like can be controlled by using the techniques described herein.

Figure 3:
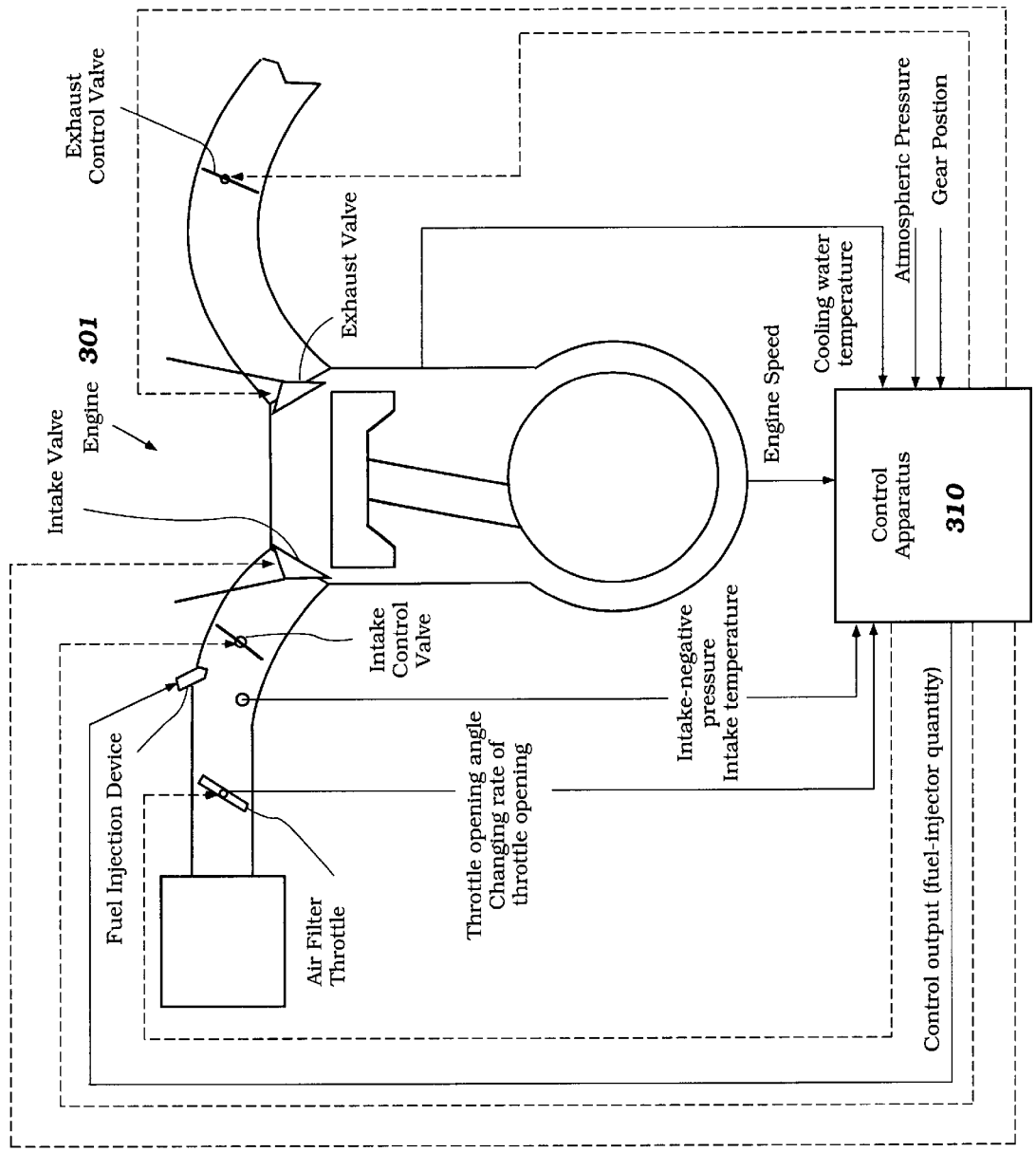
FIG. 3 is a schematic view showing the relation ship between an engine and a control system.

FIG. 3 is a schematic view showing the relationship between an engine 301 and a control device 310 performing the above-described integrated control system 100.

As shown in FIG. 3, the control device 310 controls the engine 301 in such a way that fuel efficiency and acceleration performance are compatible with each other, based on information provided to the control device 310, such as an engine speed (RPM), an intake-negative pressure, a degree of a throttle opening (angle), a changing rate of the throttle opening, an atmospheric pressure, an intake temperature, a temperature of cooling water, and a setting (position) gear.

Evolutionary-adaptation Hierarchy Adapted to Engine Control

Figure 4:
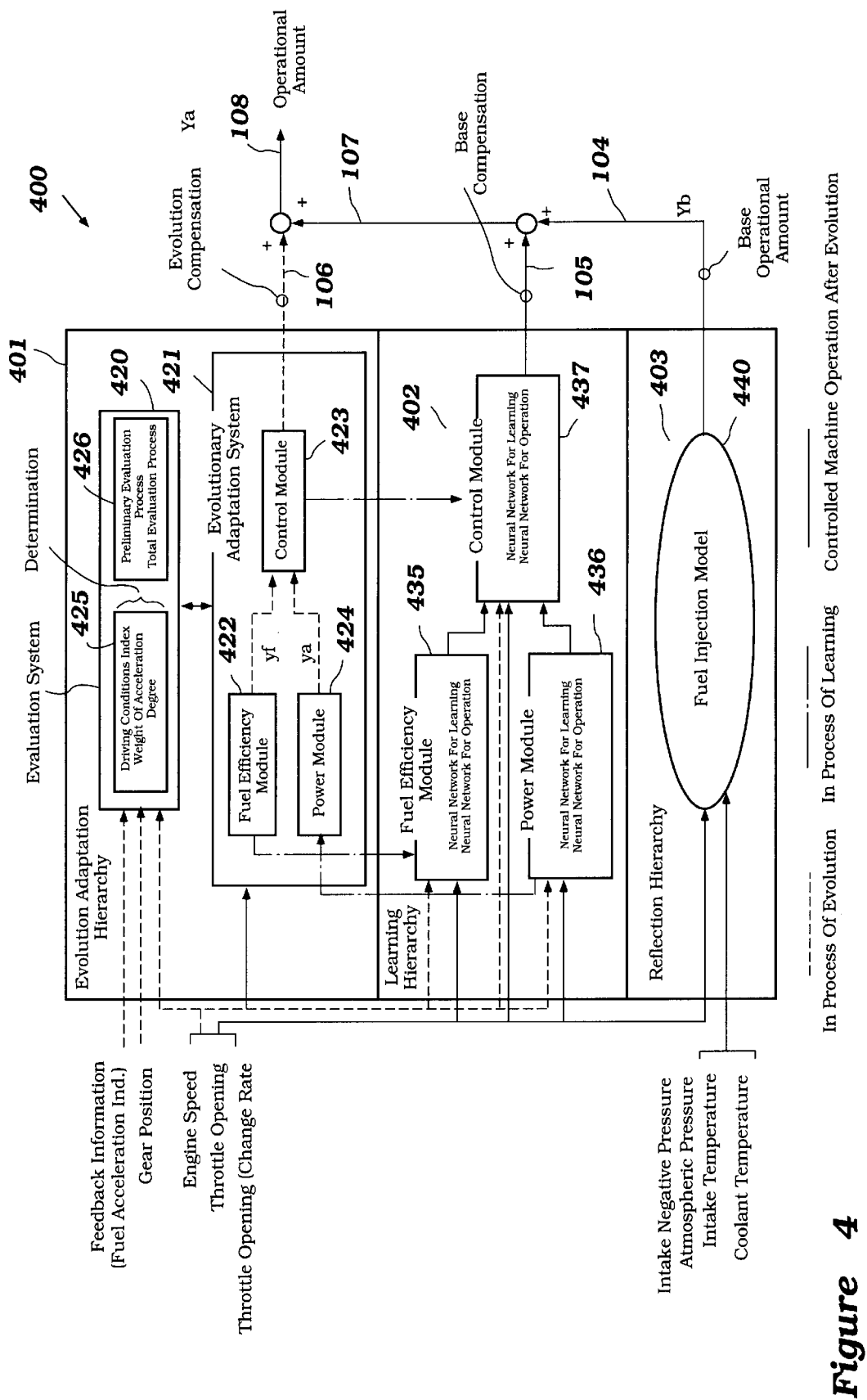
FIG. 4 is a block diagram of an engine control system.

FIG. 4 is a schematic block diagram of a control system 400 included in the control device 310. The control system 400 includes an evolutionary-adaptation hierarchy 401, a learning hierarchy 402, and a reflection hierarchy 403. The evolutionary-adaptation hierarchy 401 includes an evaluation system 420. The evaluation system 420 is configured to compute an evaluation value such as a driving condition index and/or an acceleration-weight value using feedback information from the engine, gear position (e.g. $1^{st}$ gear, $2^{nd}$ gear, etc.), engine speed, and/or throttle position (throttle opening). The evaluation system 420 also includes a preliminary evaluation processor (calculator) and a total evaluation processor (calculator).

The evaluation system 420 provides data to an evolutionary adaptation system 421. In the evolutionary adaptation system 421, an evolution data output from a fuel efficiency module 422 is provided to a first input of a control module 423 and an evolution data output from a power module 424 is provided to a second input of the control module 423. An evolution data output from the control module 423, being an evolution compensation value 106, is provided to a first input of an adaptation adder. An output of the adaptation adder is an operational amount 108.

The learning hierarchy 402 includes a fuel efficiency module 435, a power module 436, and a control module 437. The modules 435–437 each include a NN for learning and a NN for operation. A learning output from the fuel efficiency module 422 is provided to a learning input of the fuel efficiency module 435. A learning output from the power module 424 is provided to a learning input of the power module 436. A learning output from the control module 423 is provided to a learning input of the control module 437.

The engine speed, throttle opening, and throttle opening change rate data are provided to evolution inputs and control inputs of the modules 435–437.

The reflection hierarchy 403 includes a fuel injection model 440. Inputs to the fuel injection model 440 include engine speed, throttle opening, throttle opening change rate, intake vacuum (intake negative-pressure), atmospheric pressure, intake temperature, and coolant temperature.

A basic control output 104 from the fuel injection model 440 is provided to a first input of a first adder. A basic compensation value 105 from the control module 437 is provided to a second input of the first adder. An output of the first adder is provided to a second input of the adaptation adder. (FIG. 11 below is a flow chart showing a basic behavior of the evolutionary-adaptation hierarchy 101.)

FIGS. 5 and 6 show the relationship between a distribution pattern of the maximum engine RPM at each gear position within a certain time period and a driving state index P. (The evaluation system 425 is equipped with a neural network 700 (shown in FIG. 7) which learns the relationship between a distribution pattern of the maximum engine RPM at each gear position to determine a driving state index P.

Figures 5A, 5B:
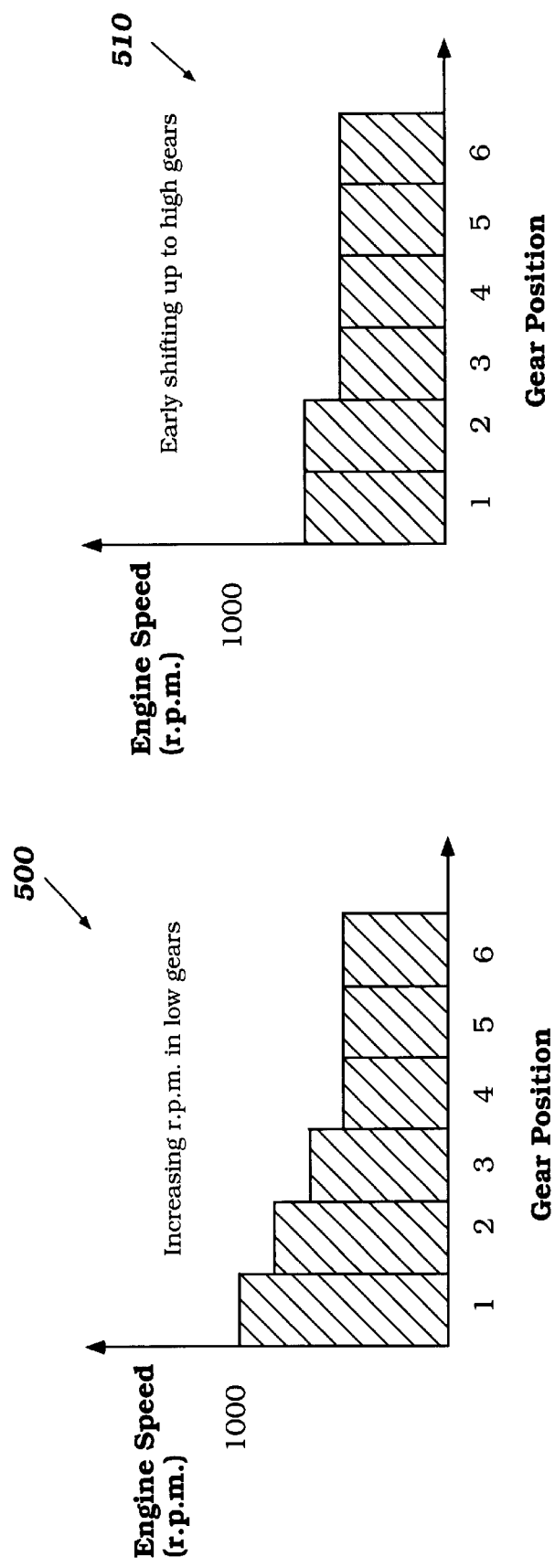
FIG. 5A shows a pattern when the RPM is increased in low gears.
FIG. 5B shows a pattern when the gear is shifted up to high gears at an early stage.

For example, a user who likes sporty driving tends to increase the engine speed in low gears, and the distribution pattern of the engine speed can be represented by FIG. 5A. Conversely, a user who likes staid driving tends to shift up to high gears at an early stage, and the distribution pattern of the engine speed can be represented by FIG. 5B. When the neural network 700 has learned the relationship between the engine speed and the driving state index P in such a way that the driving state index P is high when the distribution pattern is represented by FIG. 5A, while driving state index P is low when the distribution pattern is represented by FIG. 5B, the neural network shows that the higher the preference for sporty driving, the higher the driving state index P becomes, while the higher the preference for staid driving, the lower the driving state index P becomes. In this way, the driving state index P can represent the user's preference.

Figures 6A, 6B, 6C:
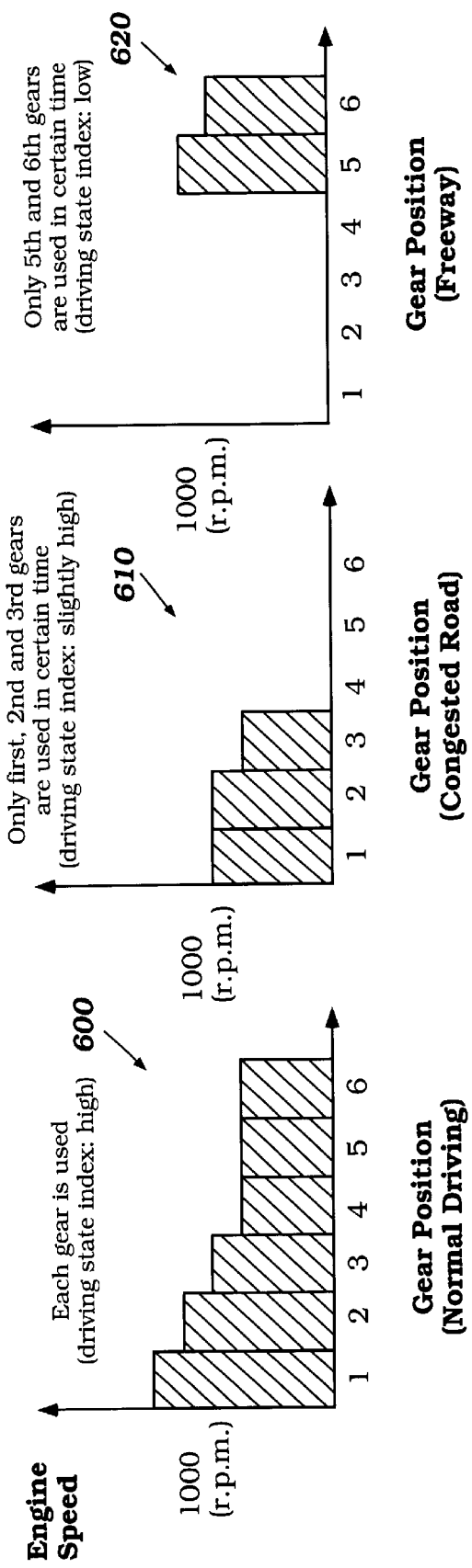
FIG. 6a shows a pattern when each gear is used (normal driving)
FIG. 6b shows a pattern when only the first, second, and third gears are used the RPM is increased in low gears (congested road)
Figure 7:
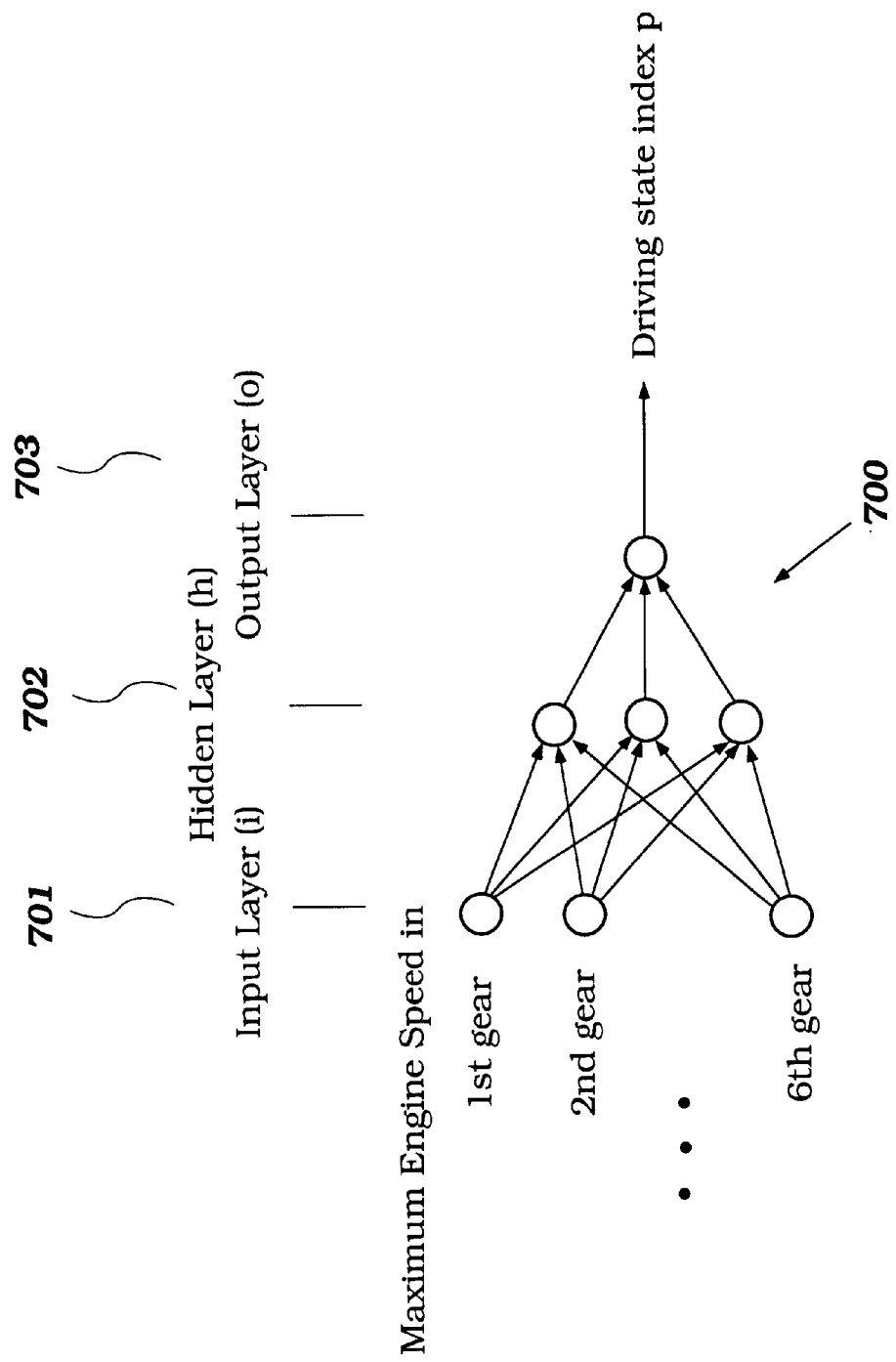
FIG. 7 is a block diagram of a neural network for computing a driving state index P.

In addition, as shown in FIG. 6a, when all of the gears from the first through the sixth gears are used in a certain time period, the driving state index P is high. When only low gears are used in a certain time period, as shown in FIG. 6b, the driving state index P is slightly high. When only high gears are used in a certain time period, the driving state index P is low. In a typical vehicle, all of the gears are used during in normal driving (e.g. city driving), only low gears are used when on a congested road, and only high gears are used when on a freeway, and thus, according to the driving state index P output from the neural network 700, FIGS. 6a, 6b, and 6c show normal driving, driving on a congested road, and driving on a freeway, respectively.

In the evaluation system 420, based on the driving state index P, the driving state at the moment is presumed, and an acceleration-weighting ratio γ is determined by judging whether the user prefers fuel efficiency or acceleration performance.

Figure 8:
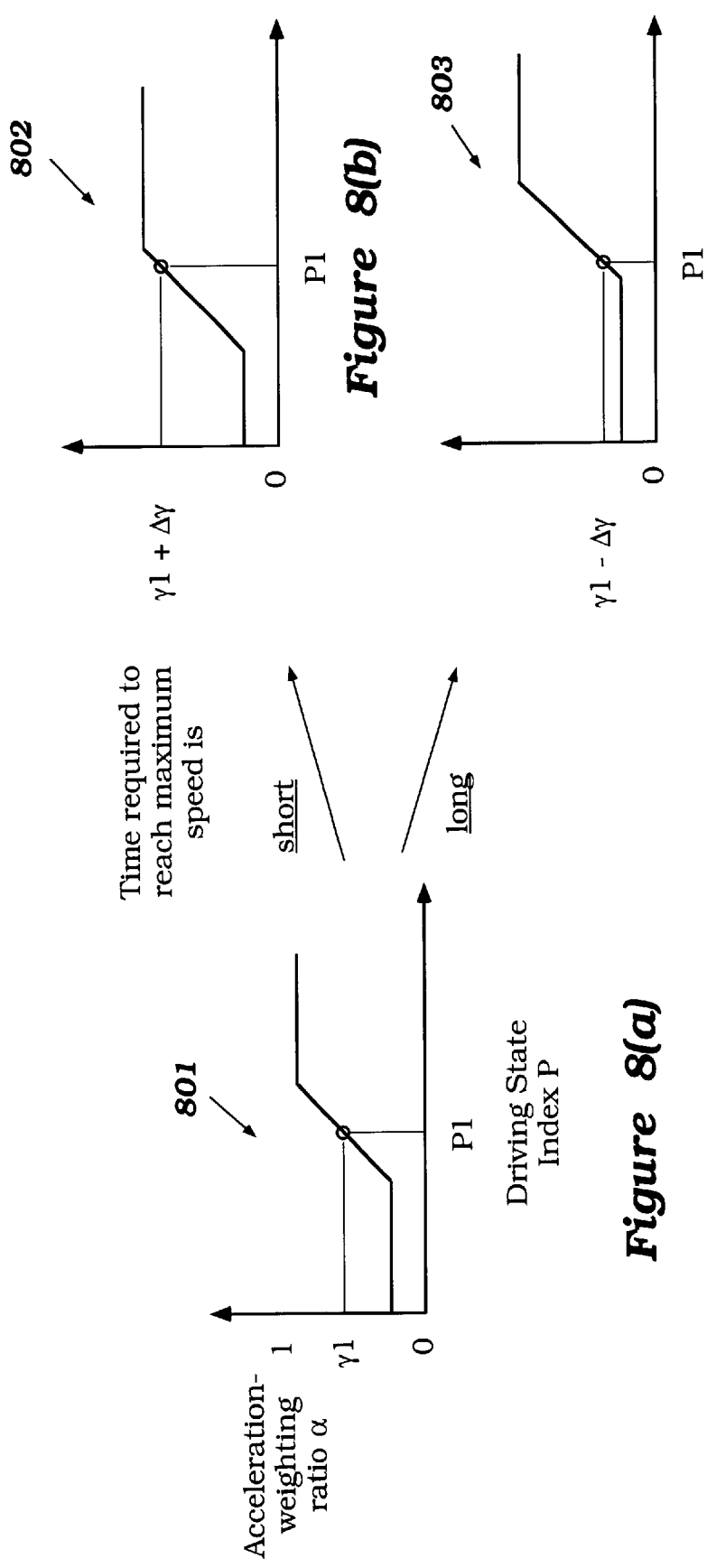
FIG. 8 shows the relationship between the acceleration-weighting ratio $\alpha$ and the driving state index P, used in the evolutionary-adaptation hierarchy according to the present invention.

The acceleration-weighting ratio γ can be determined from a predetermined equation of an acceleration-weighting ratio γ and a driving state index P, as shown in FIG. 8. For example, when driving on a freeway and the driving state index P is low (FIG. 6c), the acceleration-weighting ratio γ is low, i.e., fuel efficiency is regarded as important. Conversely, when the driving state index P is high, i.e., sporty driving (FIG. 5a), the acceleration-weighting ratio γ is high, i.e., acceleration performance is regarded as important.

Figure 9:
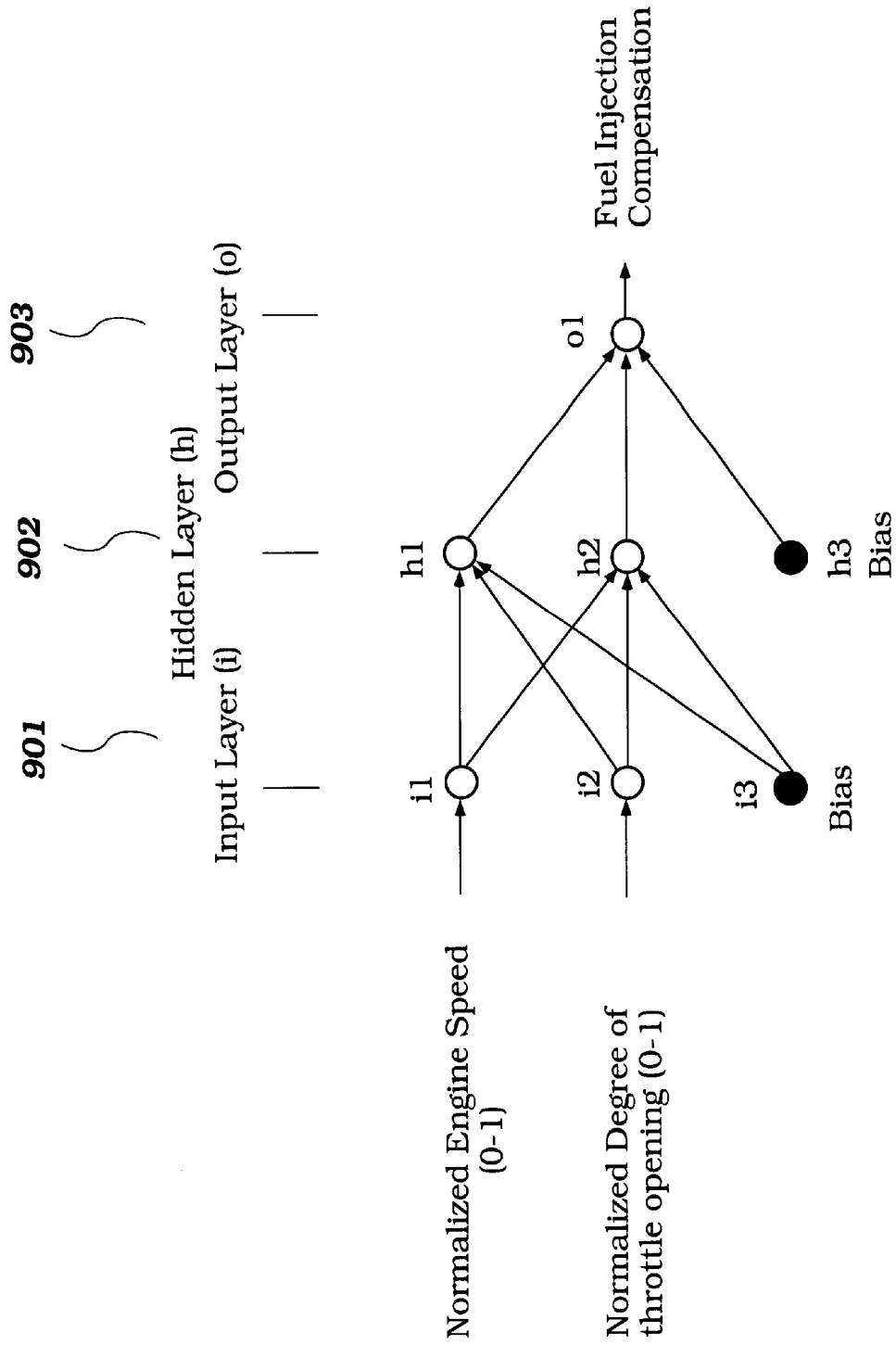
FIG. 9 shows a neural network for computing a fuel injection compensation.

The evolutionary-adaptation system 401 includes at least one fuel efficiency module 422 and one power module 424, and causes them to mutually cooperate and compete to obtain a change to be more adaptable or suitable. Each module includes a neural network having two inputs and one output, as shown in FIG. 9. FIG. 9 shows a neural network 900 having three layers, an input layer 901, a hidden layer 902, and an output layer 903. Inputs to the input layer 901 include normalized engine speed and normalized throttle opening. Bias values are provided to nodes in the hidden layer 902 and the output layer 903. A fuel injection compensation is provided at an output from the output layer 903.

The fuel efficiency module aims at improving fuel efficiency, and the power module aims at improving power performance. The inputs into each module include the normalized engine speed and the normalized throttle opening. Based on the input, each module outputs a compensation for the fuel-injection quantity (i.e., compensation for the control base value from the reflection hierarchy 403).

The evolutionary-adaptation hierarchy 401 evolves the degree of coupling in the neural network constructing the fuel efficiency module and that of the power module 424, alternately, using a genetic algorithm in accordance with the user's preference and the using environment, i.e., the evolution by the evolution system 421. After completing the evolution of both modules, the degree of coupling of each module is fixed to the evolved degree, and using an evolutionary compensation Y based on the output from both modules, the engine is controlled. In the above, the genetic evolution of the modules takes place in each module alternately, wherein while the fuel efficiency module is evolving, the degree of coupling of the neural network in the power module is typically fixed, and vice versa.

The engine control using an evolutionary compensation Y in the evolutionary-adaptation hierarchy continues until the learning in the learning hierarchy described below is completed. Upon completion of the learning in the learning hierarchy, the fuel efficiency module 422 and the power module 424 are reset, and the output from the evolutionary-adaptation hierarchy 401 is set at zero.

Figure 10:
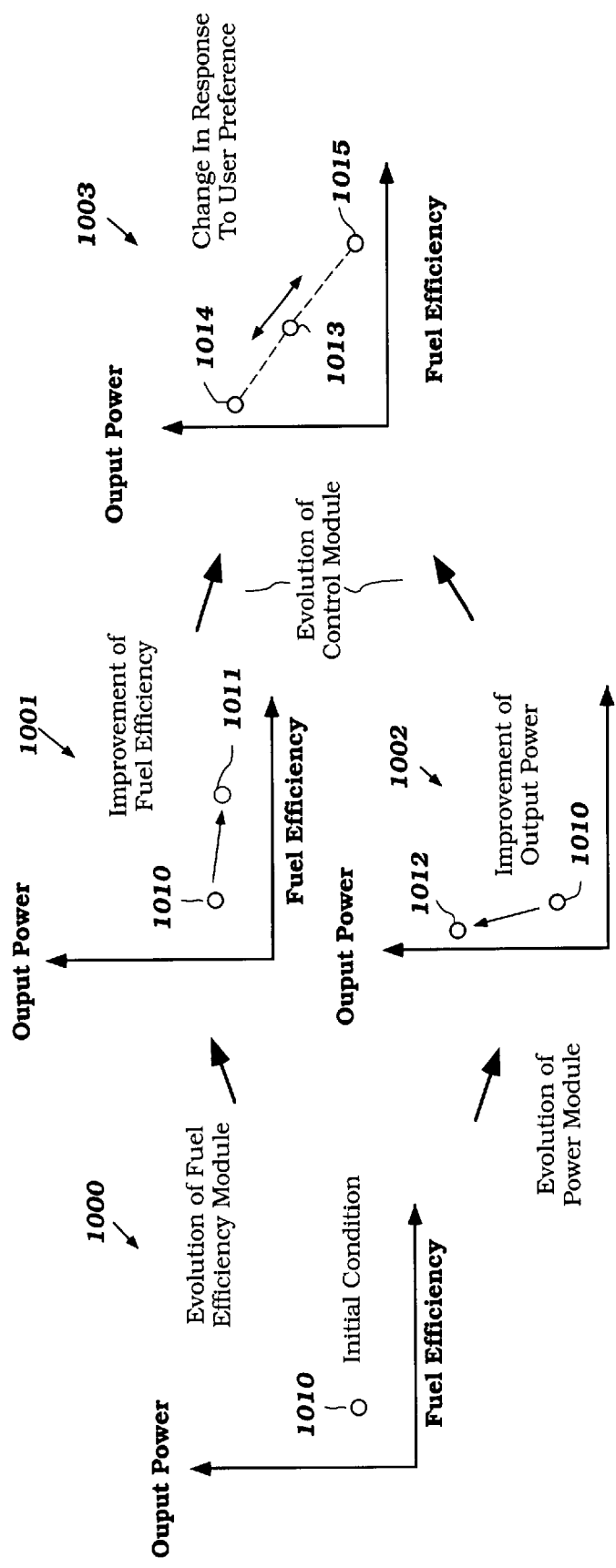
FIG. 10 shows plots illustrating various aspects of the fuel efficiency versus output power (acceleration) produced by the control system.

FIG. 10 shows plots 1000–1003 illustrating various aspects of the fuel efficiency versus output power (acceleration) produced by the control system 400. Each plot 1000–1003 shows fuel efficiency on a horizontal axis and output power (acceleration) on a vertical axis. The plot 1000 shows a single operating point 1010 being an initial condition (before optimization). The plot 1001 shows movement of the operating point from the initial point 1010 to a point 1011 (after evolution of the fuel efficiency module) corresponding to an improvement in fuel efficiency with a small loss in output power. The plot 1002 shows movement of the operating point from the initial point 1010 to a point 1012 (after evolution of the power/acceleration module) corresponding to an improvement in output power with a small loss in fuel efficiency.

The plot 1003 shows operation of the engine after evolution of the control module (based on the plots 1001 and 1002). The plot 1003 shows operation in a range between a point 1014 corresponding to relatively high output power and a point 1015 corresponding to relatively high fuel efficiency. The actual operating point 1013 varies linearly between the point 1014 and the point 1015.

Evolution of Modules Using a Genetic Algorithm

Figure 11:
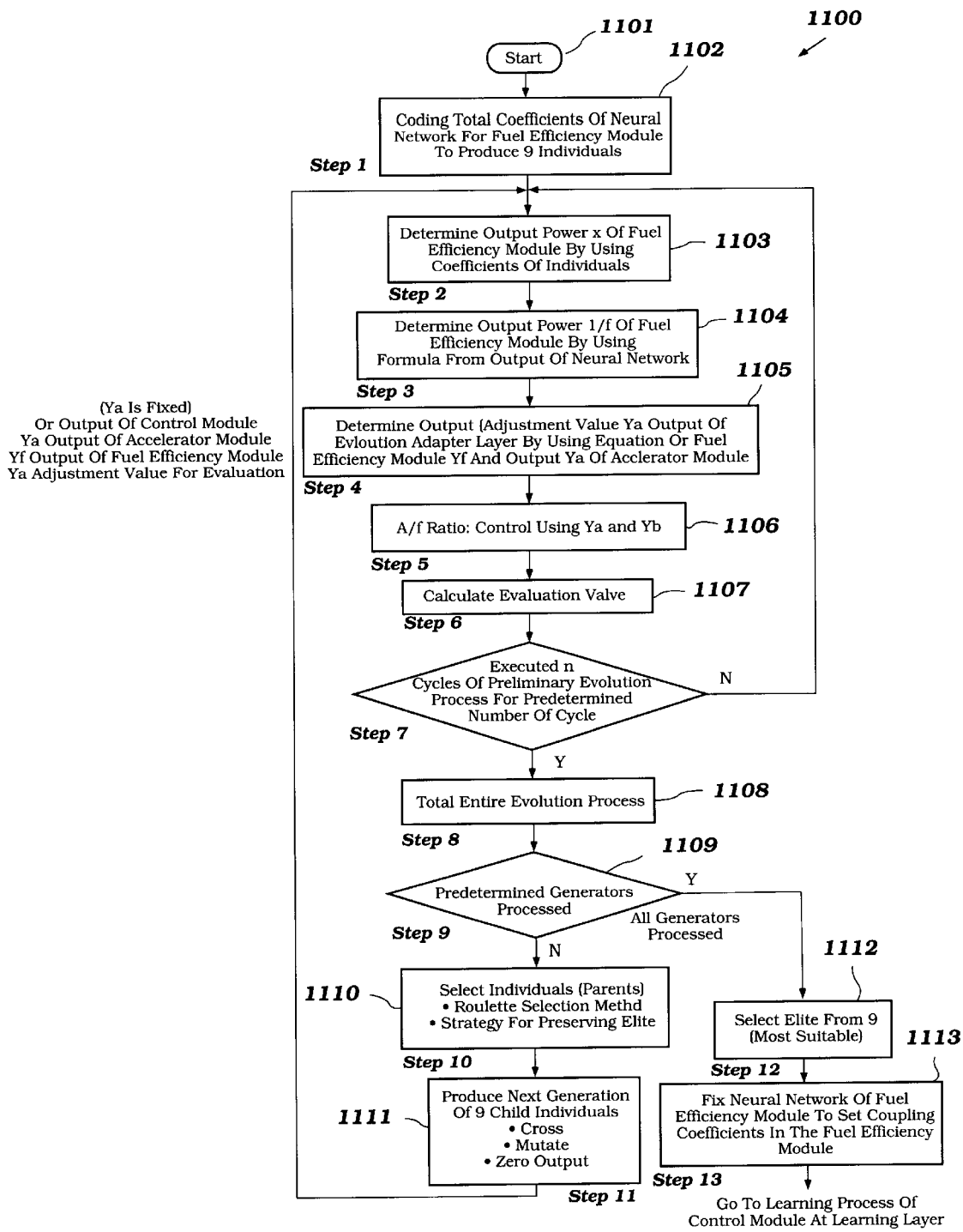
FIG. 11 is a flowchart showing operation of the evolution module using a genetic algorithm.

The evolution of a module using a genetic algorithm will be explained with reference to a flow chart 1100 shown in FIG. 11 showing the evolution of the fuel efficiency module, as an example.

First, as shown in a step 1101 (shown in FIG. 11) in the fuel efficiency module, a first generation of individuals is created, which is composed of multiple individuals α(n) for n=1–9 (nine individuals in this embodiment) encoded by coupling coefficients, used as genes, of the neural network in the fuel efficiency module. Initial values of the genes, (i.e., the coupling coefficients), of each individual are typically randomly set in a predetermined range (e.g., approximately −10 to 10). By creating one individual having a gene value (coupling coefficient value) of zero, it is possible to avoid abating, in the process of evolution, the performance characteristics lower than those before evolution.

For one of the individuals created in step 1, individual a(1) for example, output x of the neural network is determined using the fuel efficiency module based on the actual information (the engine speed and the degree of the throttle opening) (step 1102). In step 1103, an output yf of the fuel efficiency module is determined by linear transformation of the output x by the equation $$yf = 2*Gx - G$$

Where yf is an output from the fuel efficiency module, x is an output from the neural network of the fuel efficiency module, and G is an output gain of the evolutionary-adaptation hierarchy. By linear transformation of the output x of the neural network, the output yf from the fuel efficiency module does not become extremely high, i.e., evolution progresses gradually as a whole. That is, an extreme change in engine behavior due to the evaluation or evolution is prevented.

After determining the output yf of the fuel efficiency module for the individual a(1), the process advances to a process block 1104 where the output from the evolutionary-adaptation hierarchy (compensation Ya) is calculated by using a weighted sum of the output yf and an output ya of the acceleration module (whose coupling coefficient is fixed). The summation in the weighted sum is determined by an output α from the control module. The compensation Ya is expressed as:

$$Ya = \alpha ya + (1-\alpha) yf$$

Where yf is the output from the fuel efficiency module 422, and ya is the output from the acceleration module. That is, when the acceleration-weighting ratio is 1, the compensation ya is an output only from the acceleration (power) module 424. When the acceleration-weighting ratio is 0, the compensation Ya is an output from the fuel efficiency module.

After determining the output Ya of the evolutionary-adaptation hierarchy for individual a(1), this compensation being Ya(1) is actually output from the evolutionary-adaptation hierarchy, and is added to the control base value Yb (from the reflection hierarchy) and the engine 300 is operated by the output compensated for by the compensation Ya (step 1105).

The evaluation system in the evolutionary-adaptation hierarchy receives feedback information related to fuel efficiency from the engine 300 operated by the output compensated for by the compensation Ya(1) obtained from individual α(1), followed by calculating an evaluation value (e.g., fuel efficiency) in a step 1107. Based on the result, individual a(1) is evaluated by determining adaptability of individual α(1). In the above, fuel efficiency is calculated from the travel distance and the amount of consumed fuel.

The above steps 1102 through 1106 are repeated for a predetermined number of cycles of the evolution process. Repetition of the loop containing steps 1102 through 1106 is controlled by a decision block 1107. Once the loop is completed, the process advances to a process block 1108 where the total evolution is processed.

After determination of adaptability of all of the individuals is completed, it is determined whether or not the generation to which the individuals belong is the final generation (in a decision block 1109). If it is not the final generation, parent individuals are selected in a process block 1110. In this selection, a roulette-type selection method is employed, i.e., the parent individuals are stochastically selected based on the probability correlated to the adaptability of each individual.

In the above, if the alternation of generations is strictly performed, there is the possibility that individuals highly evaluated are destroyed. To prevent destruction of all individuals belonging to the previous generation, an elite reserve strategy is typically employed, wherein highly evaluated individuals remains alive. In addition, to maintain the ratio of the maximum adaptability to the average adaptability in a group consisting of multiple individuals, the adaptability is linearly transformed.

After selecting parent individuals, cross-over is performed using the selected individuals as parent individuals to create a second generation composed of nine children (in a step 1111). The cross-over between individuals may be created by single-point cross-over, double-point cross-over, or normal distribution cross-over.

The normal distribution cross-over is a method of creating children based on a rotation-symmetrical normal distribution with respect to an axis connecting the parents, using chromosomes expressed by the actual number (individuals). The standard deviation of the normal distribution is correlated with the distance between the parents in terms of the components in the direction of the main axis connecting the parents. Other components of the axis are made correlated with the distance between the line connecting the parents and a third parent sampled from the group. This crossover method has an advantage that the characteristics of the parents are easily passed on to their children.

In addition to cross-over, mutation of genes is introduced in the created nine children by randomly changing the gene value (the degree of coupling) at a given probability.

By the above processes, after the next generation is created, the coupling coefficients of the neural network of the fuel efficiency module are fixed to that of an elite (best) individual. After the evolutionary treatment of the first generation of the acceleration module is completed, the processes are repeated from step 1102, evaluation of each individual of the next generation, and selection is conducted.

These processes are repeated until the generation reaches the predetermined final generation whereupon the process advances from the decision block 1109 to a process block 1112. Accordingly, children of each generation evolve in accordance with the evaluation in the evaluation system, (i.e., the user's preference). It is determined in step 1109 whether or not the generation is final. If it is determined in step 1109 that the generation is final, an individual having highest adaptability, the elite individual, is selected from the nine individuals of the final generation (step 1112). The coupling coefficient of the neural network of the fuel efficiency module is fixed at the gene possessed by the most elite individual (step 1113). After completion of the step 1113, the evolution process is complete and the control system continues at the learning hierarchy.

In the acceleration module, the same treatment as in the fuel efficiency module is conducted until the generation reaches the final generation. In the above, evaluation in steps 1106 and 1107 for the acceleration module is conducted using an acceleration evaluation index. The acceleration evaluation index is calculated by dividing the acceleration by the changing rate of the throttle opening.

Figure 12:
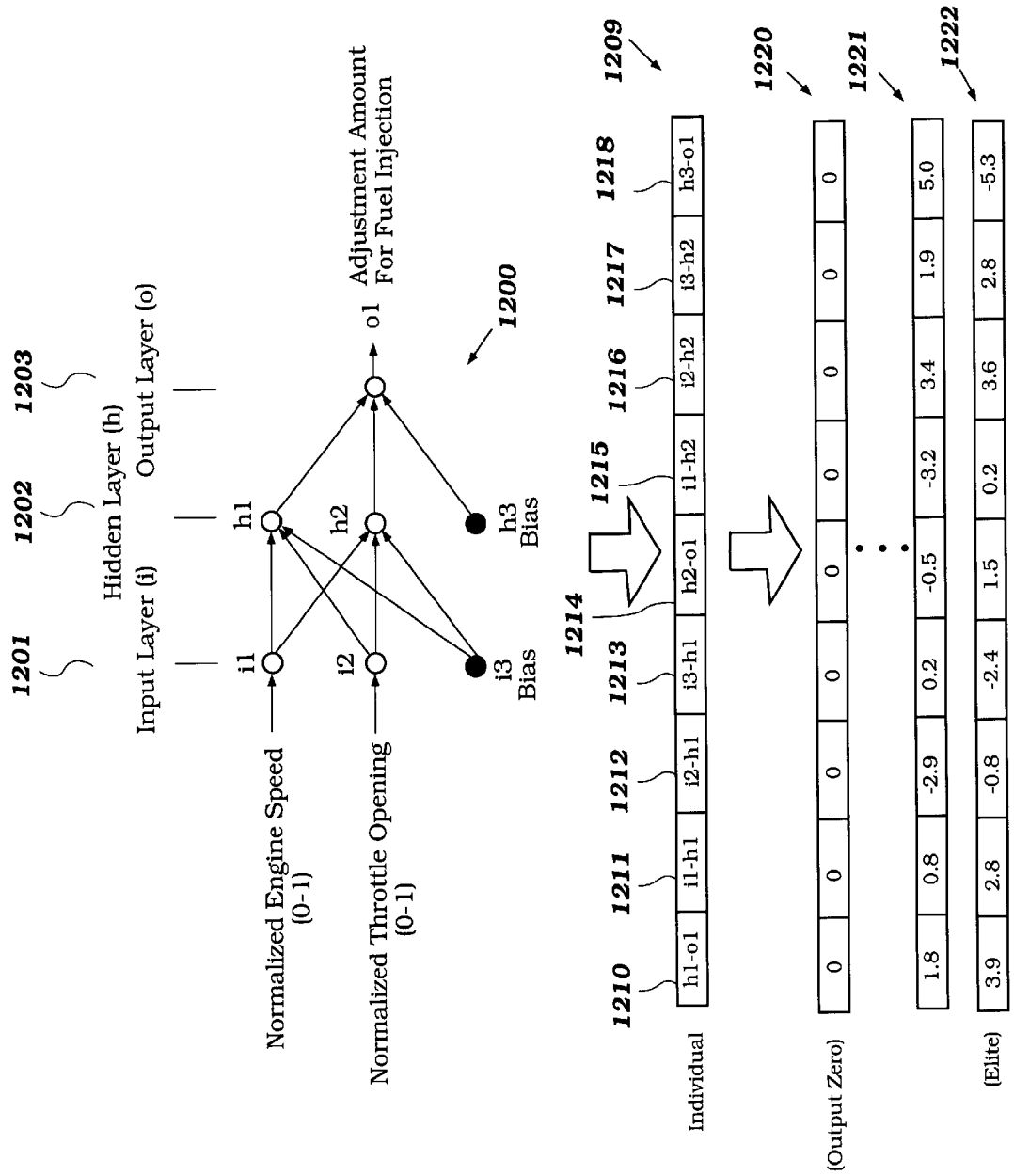
FIG. 12 is a schematic diagram showing an embodiment wherein a first generation is created, which is composed of multiple individuals encoded by coupling coefficients, used as genes, of the neural network in the fuel efficiency module.

FIG. 12 is a schematic diagram showing an embodiment wherein a first generation is created, which is composed of multiple individuals α(n) for n=1–9 encoded by coupling coefficients, used as genes, of the neural network constructing the fuel efficiency module. FIG. 12 shows a NN having an input layer 1201, a hidden layer 1202, and an output layer 1203. Inputs to the input layer 1201 include normalized engine speed and normalized throttle opening. Bias inputs are provided to the neurons of the hidden layer 1202 and the output layer 1203. An output from the output layer 1203 is a fuel injection compensation value. Coding of the weights for the NN 1200 is shown in a chromosome 1210 having 18 genes 1211–1219. Each gene corresponds to a coupling weight in the NN 1200. The structure 1210 is used to construct individual chromosomes such as an output-zero individual 1220 and an elite individual 1222.

The total evaluation value CNT is computed in the evaluation system by the equation:

$$CNT = (1-\gamma) \cdot \text{Scale} \cdot (FC - FC\text{base})/FC\text{base} + \gamma \cdot \text{Scale} \cdot (RP - RP\text{base})/RP\text{base}$$

Where $\gamma$ is the acceleration weighting rapt, FC is the fuel efficiency coefficient, FCbase is the fuel efficiency base value, RP is the response performance coefficient, RPbase is the response performance base value, and Scale is a coefficient to balance response versus fuel efficiency.

Figure 13:
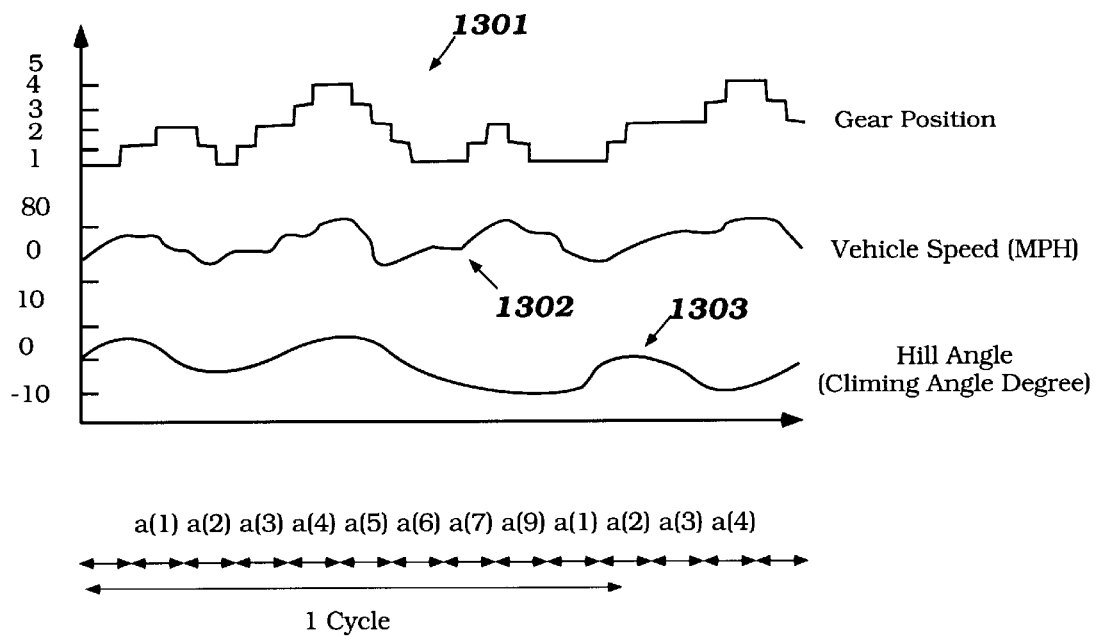
FIG. 13 shows aspects of each operation cycle.

FIG. 13 shows aspects of each operation cycle. Each cycle includes variations in gear position, variations in vehicle speed (in miles per hour), and variations in hill angle (climbing uphill and going downhill).

Figure 14:
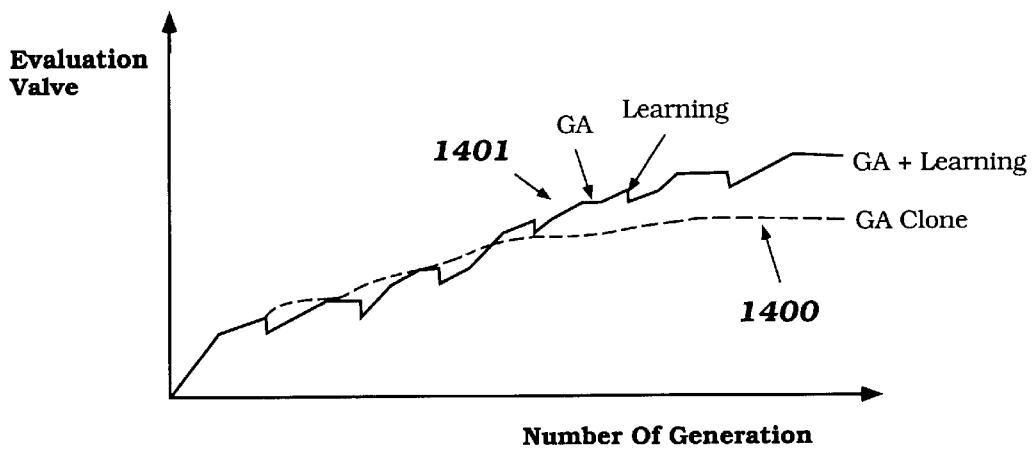
FIG. 14 shows plots comparing control using a genetic analyzer alone and control using a genetic analyzer plus learning.

FIG. 14 shows typical evaluation values corresponding to use of a genetic analyzer alone (in a curve 1400) and a genetic analyzer in combination with a learning NN (in a curve 1401). The plots 1400 and 1401 show that as the number of generations increases, the use of GA plus learning typically provides improved performance.

Figure 15:
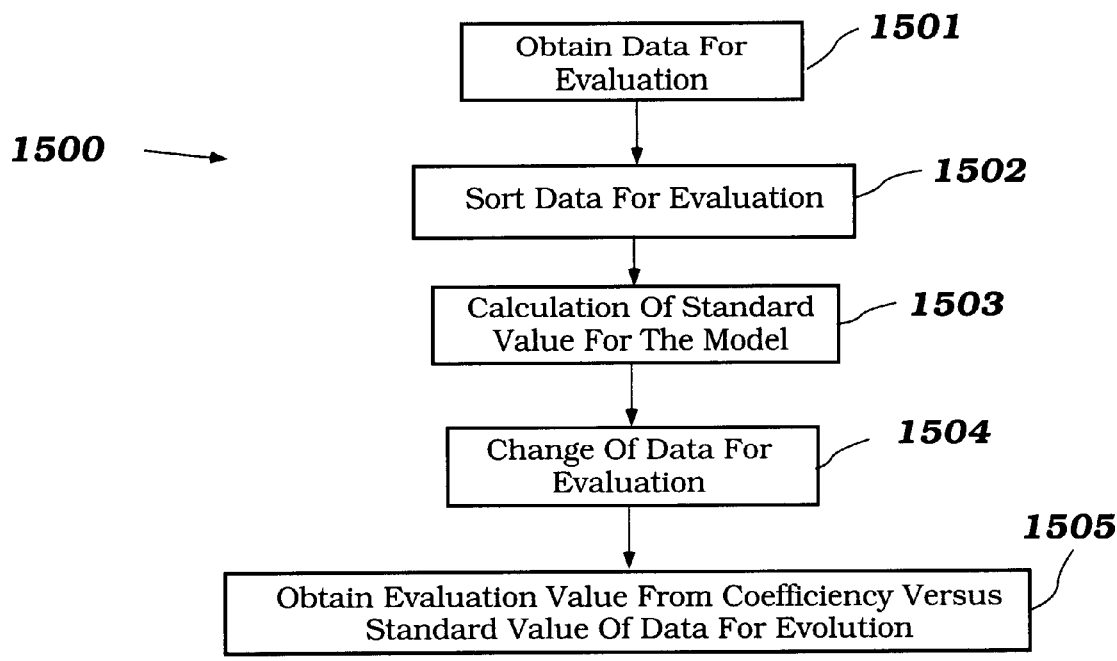
FIG. 15 is a flowchart showing overall operation.

FIG. 15 is a flowchart showing overall operation of the evaluation process. Operation begins at a process block 1501 where data is obtained for evaluation. The process then advances to a process block 1502 where the data is sorted for evaluation into domains. The process then advances to a process block 1503 where a standard model is used to calculate standard evaluation values. The process then advances to a process block 1504 where the evaluation data is changed for evaluation. The process then advances to a process block 1505 where each evaluation value is obtained from the coefficients versus the standard value of the data for each evolution.

Figure 16:
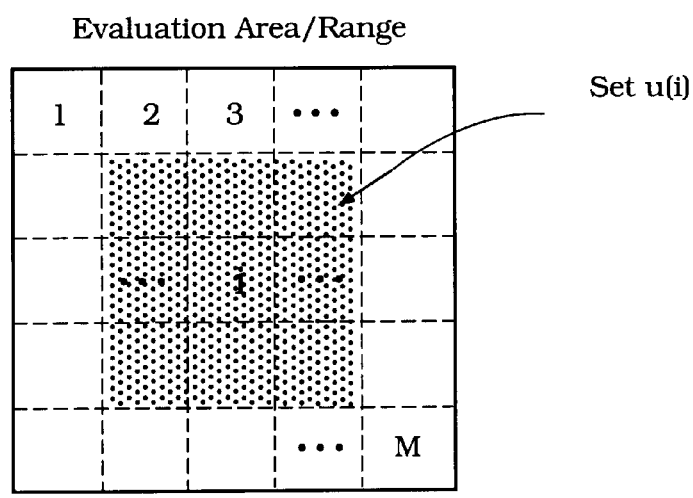
FIG. 16 illustrates an evaluation area (domain) and sub-domain.

FIG. 16 illustrates an evaluation area (domain) and subdomain. The evaluation area includes cells 1-M. A set U(i) includes a cell i and all cells adjacent to the cell i.

Figure 17:
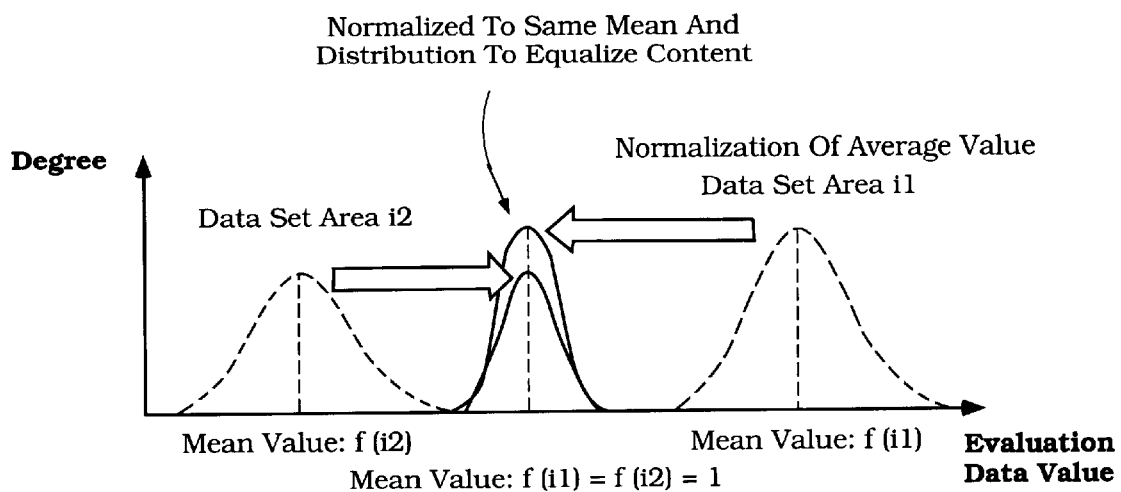
FIG. 17 illustrates normalization of the mean of various data sets to equalize contribution.

FIG. 17 illustrates normalization of the mean of various evaluation data sets to equalize contribution as described in more detail below. As shown in FIG. 17, a data set i1 (corresponding to an area or subdomain i1), having a mean f(i1) is normalized to a mean f'(i1) and data set i2 having a mean f(i2) is normalized to a mean f'(ii), such that:

$$f'(i1) = f'(i2) = 1.$$

Figure 18:
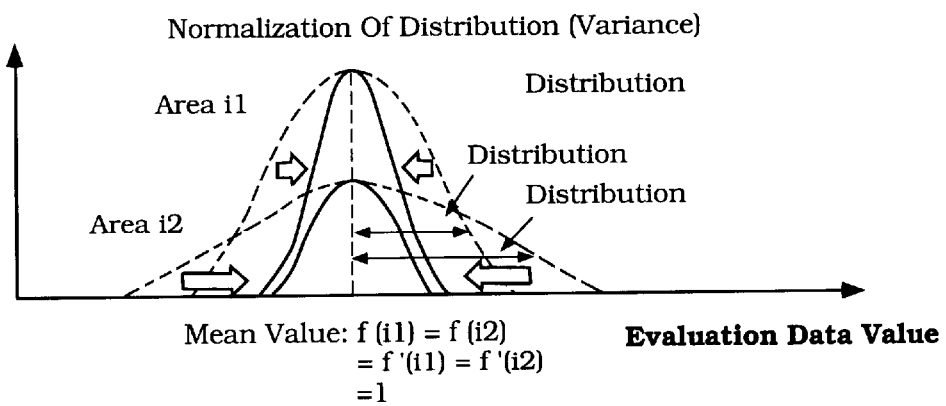
FIG. 18 illustrates normalization of the distribution (variance) of several data sets.

FIG. 18 illustrates normalization of the distribution (variance) of the datasets i1 and i2 so that the normalized means c1"=c2"=1.

Normalization begins by calculating the mean values f(i) where:

$$f(i) = \frac{\sum_{i' \in U(i)} \sum_j \sum_k f(i', j, k)}{|\{f(i', j, k) | i' \in U(i)\}|} = \frac{\sum_{i' \in u(i)} \sum_j \sum_k f(i', j, k)}{N(i')}$$

Where i denotes the domain, j denotes the individual, k denotes the observation, N(i') is the number of items in the set U(i), and f(i) is the mean for the dataset i over several individuals and several observations. From the above, it follows that the normalized mean for each individual j (and observation k) is given by:

$$f'(i, j, k) = \frac{f(i, j, k)}{f(i)}$$

Defining b as a data conversion coefficient, then:

$$f''(i, j, k) = f'(i, j, k) + \{f'(i, j, k) - f'(i)\}b$$
$$= f'(i, j, k) + \{f'(i, j, k) - 1\}b$$

The normalized mean f'(i) for domain i is expressed as:

$$f'(i) = \sum_j \sum_k f'(i, j, k)/N(i)$$

Similarly, a normalized distribution based on converted data is calculated as:

$$c'' = \frac{\sum_j \sum_k \{f''(i, j, k) - f''(i)\}^2}{N(i)}$$
$$= \frac{\sum_j \sum_k \{f''(i, j, k) - 1\}^2}{N(i)}$$

for (f''(i)=f'(i)=1) where f''(i) is the mean in region i after converting the data in region i using the conversion coefficient b.

From the above, it follows that:

$$\frac{\sum_j \sum_k \{f''(i, j, k) - 1\}^2}{N(i)} = 1 \text{ and}$$

$$\frac{\sum_j \sum_k [f'(i, j, k) + \{f'(i, j, k) - 1\}b - 1]^2}{N(i)} = 1$$

The distribution c' (that is, the distribution before data conversion) is given by:

$$c'(1+b)^2 = 1$$

thus $$b = \frac{1}{\sqrt{c'}} - 1$$

and $$c' = \frac{\sum_j \sum_k \{f'(1, j, k) - 1\}^2}{N(i)}$$

From the above, it follows that:

$$f''(i, j, k) = f'(i, j, k) + \{f'(i, j, k) - 1\}\left(\frac{1}{\sqrt{c'}} - 1\right)$$

Figure 19:
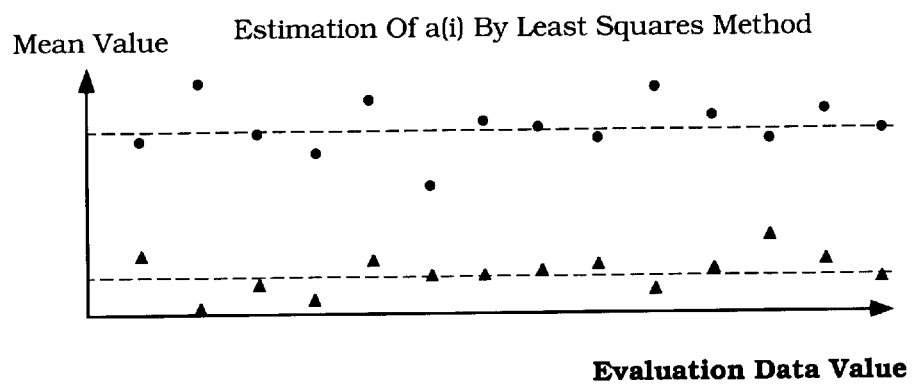
FIG. 19 illustrates the results of estimation of $\alpha(j)$ using the least squares method.

Evaluation data is modeled using a coefficient α as follows:

$$f''(i,j,k) = \alpha(j)f'(i) + \varepsilon(i,j,k)$$

where α is estimated using a least-square error (LSQ) technique and E is a residual. FIG. 19 shows estimation of α(j) for two individuals, j1 and j2, using LSQ to satisfy:

$$\min_{\alpha(j)} \sum_i \sum_k \varepsilon(i, j, k)^2$$

Using α(j), the evaluation value F(j) can be expressed as:

$$F(j) = \sum_i N(i)\alpha(j)f''(i) = \alpha(j)\sum_i N(i)$$

Taking the mean value in the domain i' (where the domain i' includes the domain i and the periphery of the domain i as shown in FIG. 16) then:

$$f(i) = \frac{\sum_{i' \in U(i)} \sum_j \sum_k f(i', j, k)}{|\{f(i', j, k) \mid i' \in U(i)\}|} = \frac{\sum_{i' \in U(i)} \sum_j \sum_k f(i', j, k)}{N(i')}$$

Where i' denotes the region, j denotes the individual, k denotes the observation, and N(i') is the number of items in the set U(i'). From the above, it follows that the normalized mean is given by:

$$f'(i', j, k) = \frac{f(i', j, k)}{f(i)}$$

Defining b as a conversion coefficient, then:

$$f''(i', j, k) = f'(i', j, k) + \{f'(i', j, k) - f'(i)\}b$$
$$= f'(i', j, k) + \{f'(i', j, k) - 1\}b$$

The normalized mean f'(i) is expressed as:

$$f'(i) = \frac{\sum_{i' \in U(i)} \sum_j \sum_k f'(i, j, k)}{|\{f(i', j, k) \mid i' \in U(i)\}|} = \frac{\sum_{i' \in U(i)} \sum_j \sum_k f'(i', j, k)}{N(i')} = 1$$

Similarly, a normalized distribution is calculated as:

$$c'' = \frac{\sum_j \sum_k \{f''(i', j, k) - f''(i)\}^2}{N(i)}$$
$$= \frac{\sum_j \sum_k \{f''(i', j, k) - 1\}^2}{N(i')}$$

for (f''(i)=f'(i)=1) where f'' (i) is the mean in region i after converting the data in region i using the conversion coefficient b and:

$$f''(i) = \frac{\sum_{i' \in U(i)} \sum_j \sum_k f''(i', j, k)}{|\{f(i', j, k) \mid i' \in U(i)\}|} = \frac{\sum_{i' \in U(i)} \sum_j \sum_k f''(i', j, k)}{N(i')} = 1$$

From the above, it follows that:

$$\frac{\sum_j \sum_k \{f''(i', j, k) - 1\}^2}{N(i')} = 1 \quad \text{and}$$

$$\frac{\sum_j \sum_k [f'(i', j, k) + \{f'(i', j, k) - 1\}b - 1]^2}{N(i')} = 1$$

The distribution c' (that is, the distribution before data conversion) is given by:

$$c'(1+b)^2 = 1$$

thus $$b = \frac{1}{\sqrt{c'}} - 1 \quad \text{and}$$

$$c' = \frac{\sum_j \sum_k \{f'(i', j, k) - 1\}^2}{N(i')}$$

From the above, it follows that:

$$f''(i', j, k) = f'(i', j, k) + \{f'(i', j, k) - 1\}\left(\frac{1}{\sqrt{c'}} - 1\right)$$

As before, evaluation data is modeled using a coefficient α as follows:

$$f''(i,j,k) = \alpha(j)f''(i) + \epsilon(i,j,k)$$

where α is estimated using a least-square error (LSQ) technique and c is a residual. FIG. 19 shows estimation of α(j) for two individuals, j1 and j2, using LSQ to satisfy:

$$\min_{\alpha(j)} \sum_i \sum_k \epsilon(i, j, k)^2$$

Using α(j), the evaluation value F(j) can be expressed as:

$$F(j) = \sum_i N(i)\alpha(j)f''(i) = \alpha(j)\sum_i N(i)$$

FIG. 20 is a flowchart showing selection of a valuation model based on steady state or transient performance. In a first process block 2001, a determination is made of the current operating state, either transient state or steady state. If the current state is a transient state, then the process advances to a process block 2002 where a response performance model (FIG. 21A) is used. If the current state is a steady state, then the process advances to a process block 2003 where a fuel efficiency model (FIG. 21B) is chosen.

FIG. 21A shows evaluation areas for response performance (acceleration). The evaluation areas are based on a change rate of average the throttle position (opening) versus engine speed at the start of acceleration. The evaluation value is responsiveness (i.e. degree of response)

FIG. 21B shows evaluation areas for fuel efficiency. The evaluation areas are based on engine torque versus engine speed. The evaluation values are fuel efficiency performance: fuel consumption amount, output power: throttle opening.

Architectures

The control unit includes: (i) a base value output unit, (ii) an evaluation unit, and (iii) an evolution unit. The base value output unit can be a conventional control unit. The evolution unit is in parallel to the base value output unit to receive indicative signals and output causative signals to be combined. The evolution unit is provided with a predetermined genetic algorithm programmed to output and add a compensation value to the base value of the causative signal when receiving indicative signals. In the evolution unit, control parameters regulate the relationship between output (causative signal) and input (indicative signals) of the evolution unit, so that a compensation value of the causative signal can be determined.

Genes in Genetic Algorithms

A genetic algorithm itself is well known in the art, and such a term is understood in itself by one of ordinary skill in the art. Genetic algorithm programs are commercially available. To use a genetic algorithm, what must be selected is genes and selection standards. In a genetic algorithm herein, coupling coefficients of the evolution neural network are used as genes, and selection is conducted based on an evaluation signal of operation of the machine so as to select most fitted coupling coefficients, wherein the coupling coefficients regulate the relationship between output (causative signal) and input (indicative signals) of the evolution neural network. Accordingly, a compensation value of the causative signal can be outputted. By using the genetic algorithm, complex relationships between input and output can be regulated. Based on the same principle, control parameters other than coupling coefficients in neural networks can be employed. The input and output of the evolution unit can be regulated by using not only neural networks but also predetermined maps, equations, fuzzy rules, and subsumption architectures, for example. The above relationship can be regulated by control parameters which can easily be determined or selected for the relationship used in the evolution unit.

Evaluation Unit

In FIG. 14, the evaluation unit is programmed to output an evaluation signal of operation of the machine when receiving pre-selected signals associated with operation of the machine. The evaluation signal is derived from the pre-selected signals associated with operation of the machine and can be any signal usable to select coupling coefficients of the evolution neural network. For example, from engine speed and gear positions in a vehicle (pre-selected signals), a driver's evaluation or preference can be derived (e.g., FIGS. 5A–5B and 6a–6c). The program to derive an evaluation signal can be based on a neural network (e.g., FIG. 9), a fuzzy rule, a fuzzy neural network, and the like.

Outline of Control by Evolution Unit

Control by the evolution unit is conducted by a method for modifying a causative signal outputted from the control unit of the machine which is operable by the causative signal, based on an evaluation signal of operation of the machine (derived from the determined characteristics of a user and/or using conditions of the machine), the control unit outputting the causative signal when receiving indicative signals indicating operation of the machine. The control unit includes: an evaluation unit programmed to output an evaluation signal of operation of the machine when receiving pre-selected signals associated with operation of the machine; and an evolution unit programmed to output a causative signal when receiving indicative signals, the evolution unit is provided with a predetermined genetic algorithm using, as genes, control parameters regulating the relationship between output and input of the evolution unit to select control parameters based upon an evaluation signal of operation of the machine, the evolution unit outputs a predetermined initial value of the causative signal prior to activation of the genetic algorithm. The control unit: activates the evolution unit to output the predetermined initial value of the causative signal to operate the machine; activates the evaluation unit to output an evaluation signal of operation of the machine and input the evaluation signal into the evolution unit; and selects control parameters by the predetermined genetic algorithm using control parameters as genes based upon the evaluation signal to output a modified value of the causative signal, while the machine is operated, thereby operating the machine by using the evolution unit with the selected control parameters. The above processes can be represented by FIG. 18 from which the base value output unit is deleted. If the base value output unit is combined, the evolution unit functions as an output-modifying unit which adds a compensation value of the causative signal to the base value outputted from the base value output unit. In the above, the evolution process by the evolution unit is conducted in parallel to the conventional control process by the base value output unit, whereby the causative signal can be modified in accordance with the manner of using the machine, (e.g., user's preference), while operating the machine.

It will be understood by those of skill in the art that numerous variations and modifications can be made without departing from the spirit of the present invention. Therefore, it should be clearly understood that the forms of the present invention are illustrative only and are not intended to limit the scope of the present invention.

What is claimed is:

1. A method for evaluation of a genetic algorithm, said genetic algorithm used in a control system for controlling a plant, said method comprising the acts of: selecting a group of individuals; and evaluating said individuals using data for evaluation, said data for evaluation categorized into subdomains of an evaluating domain, wherein said data for evaluation is sorted into an evaluation area, and wherein an evaluation value of each individual is replaced by a model of coefficients relative to a standard model.

2. The method of claim 1, wherein said standard model is used to calculate an evaluation value, wherein said evaluation value includes a distribution value of said data for evaluation in an area including a periphery of a domain containing said data for evaluation.

3. The method of claim 1, wherein said standard model is used to calculate an evaluation value, wherein said evaluation value includes a mean value of said data for evaluation in an area including a periphery of a domain containing said data for evaluation.

4. The method of claim 1, wherein said standard model is used to calculate an evaluation value, wherein said evaluation value includes a mean value and a distribution value of said data for evaluation in an area including a periphery of a domain containing said data for evaluation.

5. The method of claim 1, wherein said evaluation value is calculated as a model obtained by using a least-squares method to find coefficients relative to said coefficients of said standard model.

6. The method of claim 1, wherein a change to said data for evaluation is made in order to make a contribution degree equal to an evaluation value of an evaluation subdomain relative to evaluation data sorted to said evaluation subdomain.

7. The method of claim 6, wherein said evaluation value corresponds to an evaluation subdomain having a mean value and a distribution value.

8. The method of claim 1, wherein said controlled plant is one of an engine, an electric motor, an air-conditioner, a refrigerator, and a robot.

9. The method of claim 8, wherein a parameter for subdividing said evaluation domain is at least one of a user preference, a user skill, an operating condition, an environmental state, or an operating state.

10. The method of claim 8, wherein an evaluation model is a function of whether said plant is operating in a steady state or a transient state, a static model being used when said plant is operating in a relatively steady state and a dynamic model being used when said plant is operating in a relatively transient state.

11. The method of claim 10, wherein said transient state is evaluated according to a response performance of said plant.

12. The method of claim 11, wherein said controlled plant is an engine, and wherein said evaluation of individuals is made concerning response performance, and wherein said evaluation domain is subdivided according to a throttle state, said throttle state being a relatively steady state or a relatively transient state.

13. The method of claim 1, wherein a local evaluation value regarding a response performance is calculated by dividing a change rate of engine speed by a change rate of mean throttle opening.

14. The method of claim 10, wherein said controlled plant is an engine, and wherein a static characteristic is evaluated by at least one of a fuel efficiency and an output power.

15. The method of claim 14, wherein a local evaluation value regarding fuel efficiency performance is a fuel injection amount in an evaluation subdomain.

16. The method of claim 14, wherein a local evaluation value regarding output power is a throttle opening an evaluation subdomain.

17. A control system for controlling a plant, said control system comprising a genetic algorithm configured to evaluate individuals using data for evaluation, said data for evaluation categorized into subdomains of an evaluating domain, wherein an evaluation value of each individual is replaced by a model of coefficients relative to a standard model.

18. The control system of claim 17, wherein said evaluation value includes a distribution value.

19. The control system of claim 17, wherein said standard model is used to calculate an evaluation value, wherein said evaluation value includes a mean value of said data for evaluation in an area including a periphery of a domain containing said data for evaluation.

20. The control system of claim 17, wherein said standard model is used to calculate an evaluation value, wherein said evaluation value includes a mean value and a distribution value of said data for evaluation in an area including a periphery of a domain containing said data for evaluation.

21. The control system of claim 17, wherein said evaluation value is calculated as a model obtained by using a least-squares method to find coefficients relative to said coefficients of said standard model.

22. The control system of claim 17, wherein a change to said data for evaluation is made in order to make a contribution degree equal to an evaluation value of an evaluation subdomain relative to evaluation data for said evaluation subdomain.

23. The control system of claim 22, wherein said evaluation value corresponds to an evaluation subdomain having a mean value and a distribution value.

24. The control system of claim 17, wherein said controlled plant comprises an engine.

25. The control system of claim 24, wherein a control system is configured to provide relatively optimized performance based on at least one of a user preference, a user skill, an operating condition, an environmental state, or an operating state.

26. The control system of claim 24, further configured to provide a first evaluation model when said plant is operating in a steady state and a second evaluation model when said plant is operating in a transient state.

* * * * *